(12) United States Patent
Kim et al.

(10) Patent No.: US 10,277,366 B2
(45) Date of Patent: Apr. 30, 2019

(54) METHOD AND APPARATUS FOR TRANSMITTING SIGNAL USING UNLICENSED BAND IN CELLULAR SYSTEM

(71) Applicant: Electronics and Telecommunications Research Institute, Daejeon (KR)

(72) Inventors: Eunkyung Kim, Daejeon (KR); Seung-Kwon Baek, Daejeon (KR); Chanho Yoon, Daejeon (KR); Jae Sun Cha, Daejeon (KR); Sung Cheol Chang, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 227 days.

(21) Appl. No.: 15/010,855

(22) Filed: Jan. 29, 2016

(65) Prior Publication Data

US 2016/0227425 A1     Aug. 4, 2016

(30) Foreign Application Priority Data

Jan. 30, 2015 (KR) .................. 10-2015-0015554
Apr. 10, 2015 (KR) .................. 10-2015-0051176
(Continued)

(51) Int. Cl.
*H04L 5/00* (2006.01)
*H04W 74/08* (2009.01)
*H04L 1/18* (2006.01)

(52) U.S. Cl.
CPC .......... *H04L 5/0007* (2013.01); *H04L 1/1812* (2013.01); *H04L 5/0073* (2013.01);
(Continued)

(58) Field of Classification Search
CPC ...................................... H04L 5/0073
See application file for complete search history.

(56) References Cited

U.S. PATENT DOCUMENTS

2014/0043955 A1    2/2014   Etri
2014/0056156 A1*   2/2014   Jongren ............... H04L 1/0026
                                                                           370/252
(Continued)

FOREIGN PATENT DOCUMENTS

KR    1020140073468 A    6/2014
KR    1020150009456 A    1/2015
(Continued)

OTHER PUBLICATIONS

"Revised SID: Study on Licensed-Assisted Access to Unlicensed Spectrum," 3GPP TSG RAN Meeting #66, RP-141817, Dec. 8-11, 2014.
(Continued)

*Primary Examiner* — Hoon J Chung
(74) *Attorney, Agent, or Firm* — William Park & Associates Ltd.

(57) ABSTRACT

A method and an apparatus for transmitting a resource, and a method for the HARQ retransmission using an unlicensed band include an operation of performing clear channel assessment (CCA) for the unlicensed band; and an operation of occupying a channel of the unlicensed band according to the CCA and determining whether or not the resource is transmitted based on a position of a transmission time interval (TTI) within a channel occupancy time (COT) for the channel.

6 Claims, 32 Drawing Sheets

(30) Foreign Application Priority Data

| Jul. 23, 2015 | (KR) | .................. 10-2015-0104612 |
| Aug. 13, 2015 | (KR) | .................. 10-2015-0114935 |
| Sep. 24, 2015 | (KR) | .................. 10-2015-0135922 |
| Nov. 6, 2015 | (KR) | .................. 10-2015-0156168 |
| Jan. 29, 2016 | (KR) | .................. 10-2016-0012006 |

(52) U.S. Cl.
CPC ............ *H04L 5/001* (2013.01); *H04L 5/0044* (2013.01); *H04L 5/0055* (2013.01); *H04W 74/0808* (2013.01)

(56) References Cited

U.S. PATENT DOCUMENTS

| 2015/0036600 | A1 | 2/2015 | Etri |
| 2015/0049708 | A1 | 2/2015 | Damnjanovic et al. |
| 2015/0049709 | A1 | 2/2015 | Damnjanovic et al. |
| 2015/0124771 | A1 | 5/2015 | Etri |
| 2015/0172950 | A1* | 6/2015 | Chen .................... H04W 16/14 370/252 |
| 2017/0311322 | A1* | 10/2017 | Kim .................. H04W 72/0446 |
| 2018/0110057 | A1* | 4/2018 | Park ...................... H04W 72/12 |
| 2018/0206129 | A1* | 7/2018 | Choi ........................ H04L 1/00 |

FOREIGN PATENT DOCUMENTS

| KR | 1020150016055 A | 2/2015 | |
| WO | WO2017/078796 A1 * | 5/2017 | ............. H04L 5/00 |

OTHER PUBLICATIONS

"Study on Licensed-Assisted Access to Unlicensed Spectrum," 3GPP TR 36.889 V0.1.1, Nov. 2014, pp. 1-40.

"Evolved Universal Terrestrial Radio Access (E-UTRA); Physical layer procedures," 3GPP TS 36.213 V12.4.0, Dec. 2014, pp. 1-225.

"Evolved Universal Terrestrial Radio Access (E-UTRA); Medium Access Control (MAC) protocol specification," 3GPP TS 36.321 V12.4.0, Dec. 2014, pp. 1-60.

"Discussion on HARQ operation for LAA," 3GPP TSG RAN WG1 Meeting #80, R1-150633, Feb. 9-13, 2015, pp. 1-12.

"Discussion on UL HARQ operation for LAA," 3GPP TSG RAN WG1 Meeting #80-bis, R1-152097, Apr. 20-24, 2015, pp. 1-8.

"CSI measurement and report for LAA," 3GPP TSG RAN WG1 Meeting #82, R1-154392, Aug. 24-28, 2015, pp. 1-5.

"Discussion and details on data transmission," 3GPP TSG RAN WG1 Meeting #83, R1-157240, Nov. 15-22, 2015, pp. 1-8.

* cited by examiner

METHOD AND APPARATUS FOR TRANSMITTING SIGNAL USING UNLICENSED BAND IN CELLULAR SYSTEM

CROSS-REFERENCE TO RELATED APPLICATION

This application claims priority to and the benefit of Korean Patent Application Nos. 10-2015-0015554, 10-2015-0051176, 10-2015-0104612, 10-2015-0114935, 10-2015-0135922, 10-2015-0156168 and 10-2016-0012006 filed in the Korean Intellectual Property Office on Jan. 30, 2015, Apr. 10, 2015, Jul. 23, 2015, Aug. 13, 2015, Sep. 24, 2015, Nov. 6, 2015 and Jan. 29, 2016, the entire contents of which are incorporated herein by reference.

BACKGROUND OF THE INVENTION (a) Field of the Invention

The present invention relates to a method and an apparatus for transmitting a signal using an unlicensed band in a cellular system.

(b) Description of the Related Art

In accordance with an increase in users of mobile Internet using a mobile communication system, methods for increasing capacity of the mobile communication system have been sought. Among these methods, one method is to increase a bandwidth for the mobile communication system, which may be achieved by additionally securing a frequency of a licensed band. However, it costs a lot to license and use the frequency of the licensed band, and the frequency of the licensed band allocated for the mobile communication system is limited. Accordingly, a method for providing the mobile communication system using a frequency of an unlicensed band or a TV white space in which a lot of relatively available frequency bands exist and costs are also inexpensive has been considered. Further, a method for sharing the frequencies of the licensed/unlicensed band between operators of the mobile communication system has also been considered.

A communication system using a frequency of a band in which the frequency is shared (hereinafter, referred to as "unlicensed band") has the following limits.

First, in order to minimize an influence on another system sharing the frequency of the unlicensed band, transmission power is limited. Therefore, in the case in which a licensed band system and an unlicensed band system are installed on the same place, a coverage hole may occur.

In addition, for a fair coexisting with a neighboring unlicensed band system, the frequency of the unlicensed band should be discontinuously or randomly used. As a result, transmission reliability of a control channel, a common channel, and the like of the mobile communication system may be decreased.

Further, a regulation on the frequency of the unlicensed band should be obeyed. A system using the frequency of the unlicensed band should perform a clear channel assessment (CCA) for data transmission, and determine whether or not the channel is used depending on the result of CCA. A device (or system) occupying the channel according to the result of CCA may have a channel occupancy time limited according to a frequency regulation, may not occupy the channel during a time exceeding a maximum channel occupancy time, and needs to additionally perform the CCA in order to re-occupy the channel.

Due to the limit of the unlicensed band system described above, rather than a standalone system that independently uses the unlicensed band, a scenario in which the unlicensed band system is installed/operated complementarily with the licensed band system has been examined. In this scenario, control functions that require reliability such as a terminal control, a mobility management, and the like are performed by a system operated in the frequency of the licensed band, and traffic functions such as an increase in wireless transmission speed, a wireless traffic load distribution, and the like are operated in a form complemented by the unlicensed band system. That is, carriers of the licensed band perform the control and traffic functions, and carriers of the unlicensed band perform the traffic function. The above-mentioned operation may be implemented by a carrier aggregation (CA) technology, and as an example of the CA, an LTE carrier of the licensed band, an FDD carrier of the unlicensed band, or a TDD carrier of the unlicensed band in which an uplink and a downlink are simultaneously operated may be respectively aggregated.

The cellular system may utilize an advanced interference control technology, and inexpensive and rich frequency resources of the unlicensed band to thereby guarantee service quality at the time of providing a mobile communication service. In this case, in order to secure the above-mentioned advantages under coexistence of a variety of regulations of the unlicensed band and other unlicensed band systems, new coexistence technology and interference control technology are required. Particularly, the carrier aggregation technology that considers characteristics of the licensed band and the unlicensed band, and an operation accordingly are required. In addition, by providing reliability of wireless transmission, and reflecting limits (characteristics) for operating the device of the unlicensed band, a service equivalent to an existing cellular system should be provided.

SUMMARY OF THE INVENTION

The present invention has been made in an effort to provide a method and an apparatus for transmitting a resource using an unlicensed band.

The present invention has been made in an effort to provide a method for HARQ retransmission using an unlicensed band.

An exemplary embodiment of the present invention provides a method for receiving a resource that measures a channel in an unlicensed band. The method for receiving the resource may include receiving the resource in an occupied channel through clear channel assessment (CCA) for the unlicensed band; and determining whether or not a measurement is performed based on the resource.

In the method for receiving the resource, whether or not the resource is transmitted may be determined based on a position of a transmission time interval (TTI) within a channel occupancy time (COT) for the channel.

In the method for receiving the resource, the determining of whether or not the measurement is performed may include measuring a state of the channel when the resource is a channel state information-reference signal (CSI-RS) resource.

In the method for receiving the resource, the determining of whether or not the measurement is performed may include measuring interference from another system when the resource is a zero-power (ZP) CSI-RS resource of the CSI-RS resource.

In the method for receiving the resource, the determining of whether or not the measurement is performed may include measuring a state of the channel when the resource is a non zero-power (NZP) CSI-RS resource of the CSI-RS resource.

In the method for receiving the resource, the determining of whether or not the measurement is performed may include measuring interference for the channel when the resource is a channel state information-interference measurement (CSI-IM) resource.

Another embodiment of the present invention provides a base station including at least one processor; a memory, and a radio frequency (RF) unit, wherein at least one processor executes at least one program stored in the memory to perform an operation of performing clear channel assessment (CCA) for an unlicensed band; and an operation of occupying a channel of the unlicensed band according to the CCA and determining whether or not the resource that measures the channel is transmitted based on a position of a transmission time interval (TTI) within a channel occupancy time (COT) for the channel.

In the base station, when at least one processor performs the operation of determining whether or not the resource that measures the channel is transmitted, in the case in which the TTI is a partial subframe, and a length of the partial subframe is longer than a predetermined length, at least one processor may perform an operation of transmitting the resource.

In the base station, when at least one processor performs the operation of determining whether or not the resource that measures the channel is transmitted, in the case in which the TTI is a partial starting subframe, at least one processor may perform an operation of not transmitting the resource.

In the base station, when at least one processor performs the operation of determining whether or not the resource that measures the channel is transmitted, in the case in which the TTI is a partial ending subframe, at least one processor may perform an operation of not transmitting the resource.

In the base station, when at least one processor performs the operation of determining whether or not the resource that measures the channel is transmitted, at least one processor may perform an operation of not transmitting the resource in a first TTI, or the last TTI, or the first TTI and the last TTI of at least one TTI included in the COT In the base station, when at least one processor performs the operation of determining whether or not the resource that measures the channel is transmitted, in the case in which the TTI is a partial starting subframe, and an orthogonal frequency division multiplexing (OFDM) symbol in which the resource is transmitted is included in the TTI, at least one processor may perform an operation of transmitting the resource in the OFDM symbol.

In the base station, when at least one processor performs the operation of determining whether or not the resource that measures the channel is transmitted, in the case in which the TTI is a partial ending subframe, and an orthogonal frequency division multiplexing (OFDM) symbol in which the resource is transmitted is included in the TTI, at least one processor may perform an operation of transmitting the resource in the OFDM symbol.

In the base station, when at least one processor performs the operation of determining whether or not the resource that measures the channel is transmitted, at least one processor may perform an operation of determining whether or not the resource is transmitted according to the number of orthogonal frequency division multiplexing (OFDM) symbols included in TTI.

Yet another embodiment of the present invention provides a method for a hybrid automatic retransmission request (HARQ) retransmission using an unlicensed band. The method for the HARQ retransmission may include transmitting data to a base station through an uplink unlicensed band; and when a retransmission request for the data is received from the base station, retransmitting the data through an uplink licensed band.

In the method for the HARQ retransmission, the receiving of the retransmission request may be receiving negative acknowledgement (NACK) from the base station through a downlink licensed band.

In the method for the HARQ retransmission, the receiving of the retransmission request may be receiving a resource allocation including information requesting the retransmission of the data from the base station through a downlink licensed band.

In the method for the HARQ retransmission, the receiving of the retransmission request may be receiving a resource allocation including a parameter for the retransmission from the base station through a downlink licensed band.

The method for the HARQ retransmission may further include, when a cross-carrier scheduling is performed for the terminal, receiving acknowledgement (ACK) and/or negative acknowledgement (NACK) for the data from the base station through a downlink licensed band.

The method for the HARQ retransmission may further include, when a self scheduling is performed for the terminal, receiving ACK and/or NACK for the data from the base station through a downlink unlicensed band.

DETAILED DESCRIPTION OF THE EMBODIMENTS

Figure 1:
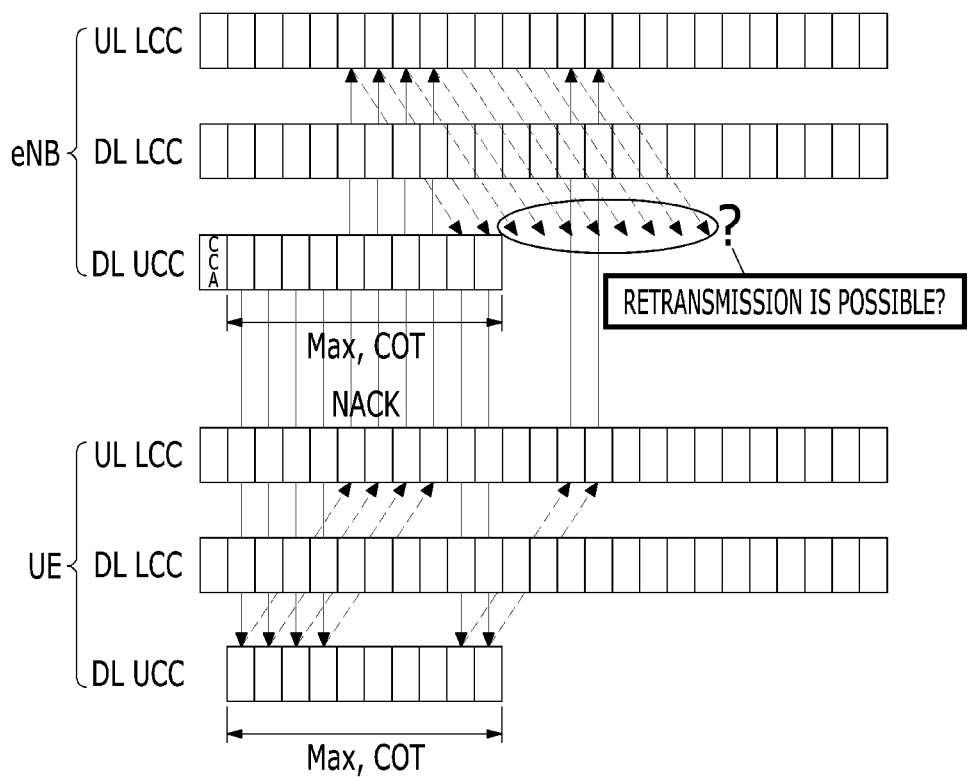
FIG. 1 is a concept view illustrating processes of transmitting data of a base station and a terminal according to an exemplary embodiment.

Hereinafter, exemplary embodiments of the present invention will be described in detail with reference to the accompanying drawings so that those skilled in the art may easily practice the present invention. However, the present invention may be implemented in various different ways and is not limited to the exemplary embodiments provided in the present description. In the accompanying drawings, portions unrelated to the description will be omitted in order to obviously describe the present invention, and similar reference numerals will be used to describe similar portions throughout the present specification.

Throughout the specification, a terminal may refer to a mobile station (MS), a mobile terminal (MT), an advanced mobile station (AMS), a high reliability mobile station (HR-MS), a subscriber station (SS), a portable subscriber station (PSS), an access terminal (AT), a user equipment (UE), a machine type communication (MTC) device, and the like, and may include functions of all or some of the MT, MS, AMS, HR-MS, SS, PSS, AT, UE, and the like.

In addition, a base station (BS) may represent an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as the base station, a relay node (RN) serving as the base station, an advanced relay station (ARS) serving as the base station, a high reliability relay station (HR-RS) serving as the base station, a small base station [femto base station (BS), a home node B (HNB), a home eNodeB (HeNB), a pico BS, a macro BS, a micro BS, or the like], or the like, and may include all or some of the functions of the ABS, the nodeB, the eNodeB, the AP, the RAS, the BTS, the MMR-BS, the RS, the RN, the ARS, the HR-RS, the small base station, and the like.

Figure 2A:
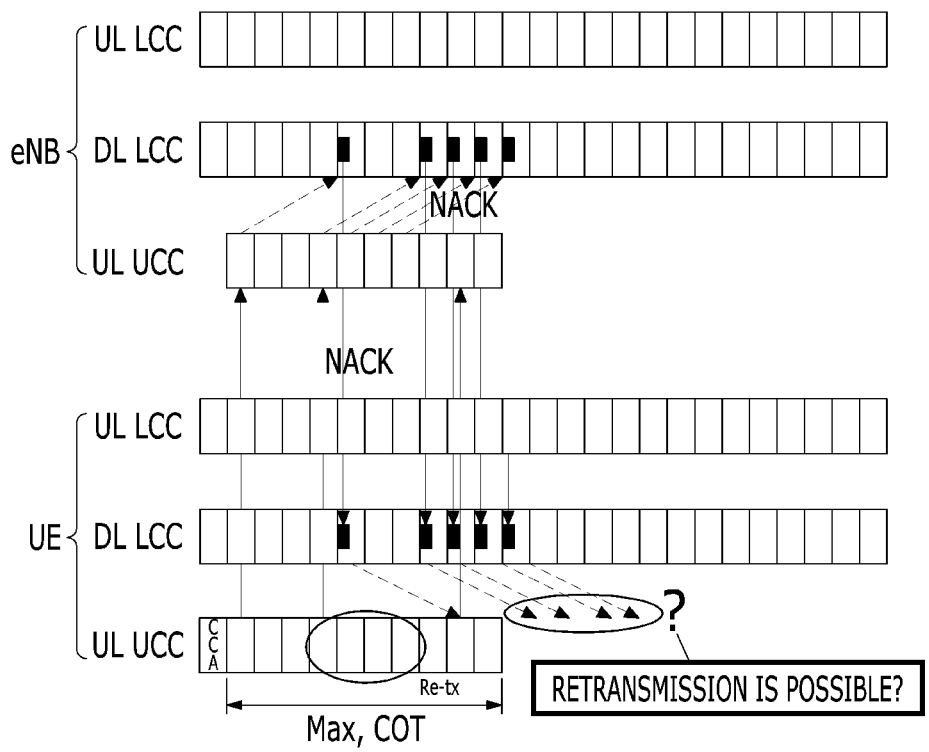
FIGS. 2A and 2B are concept views illustrating a process of the HARQ retransmission according to an exemplary embodiment.
Figure 2B:
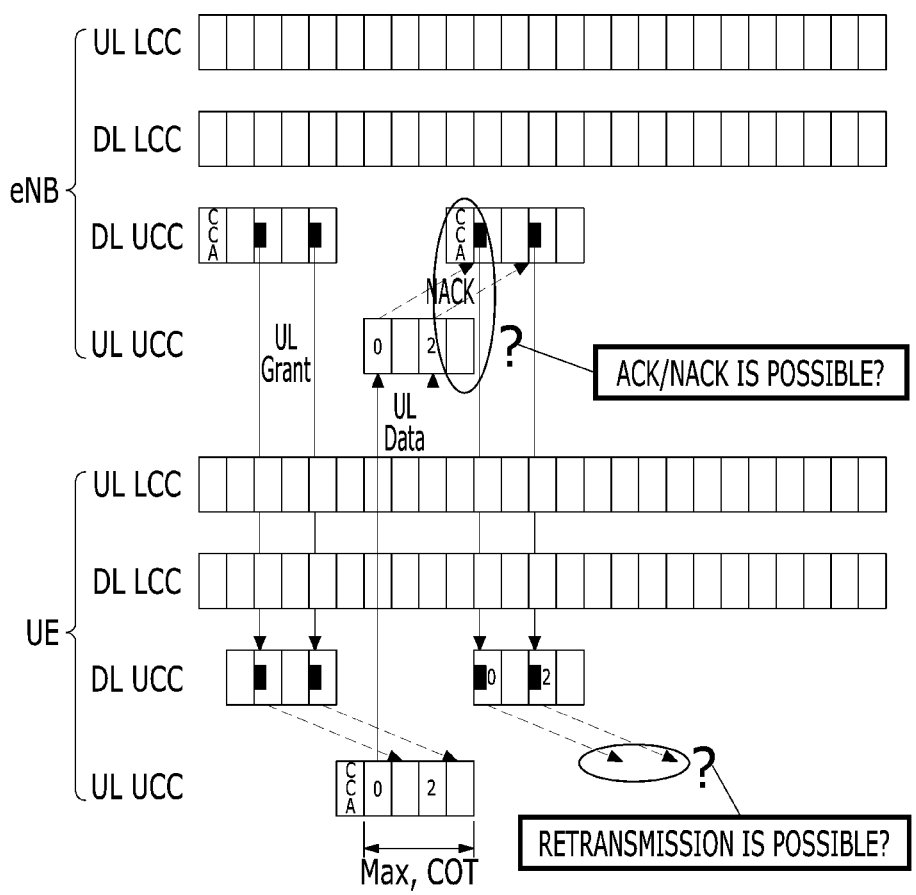
Figure 3A:
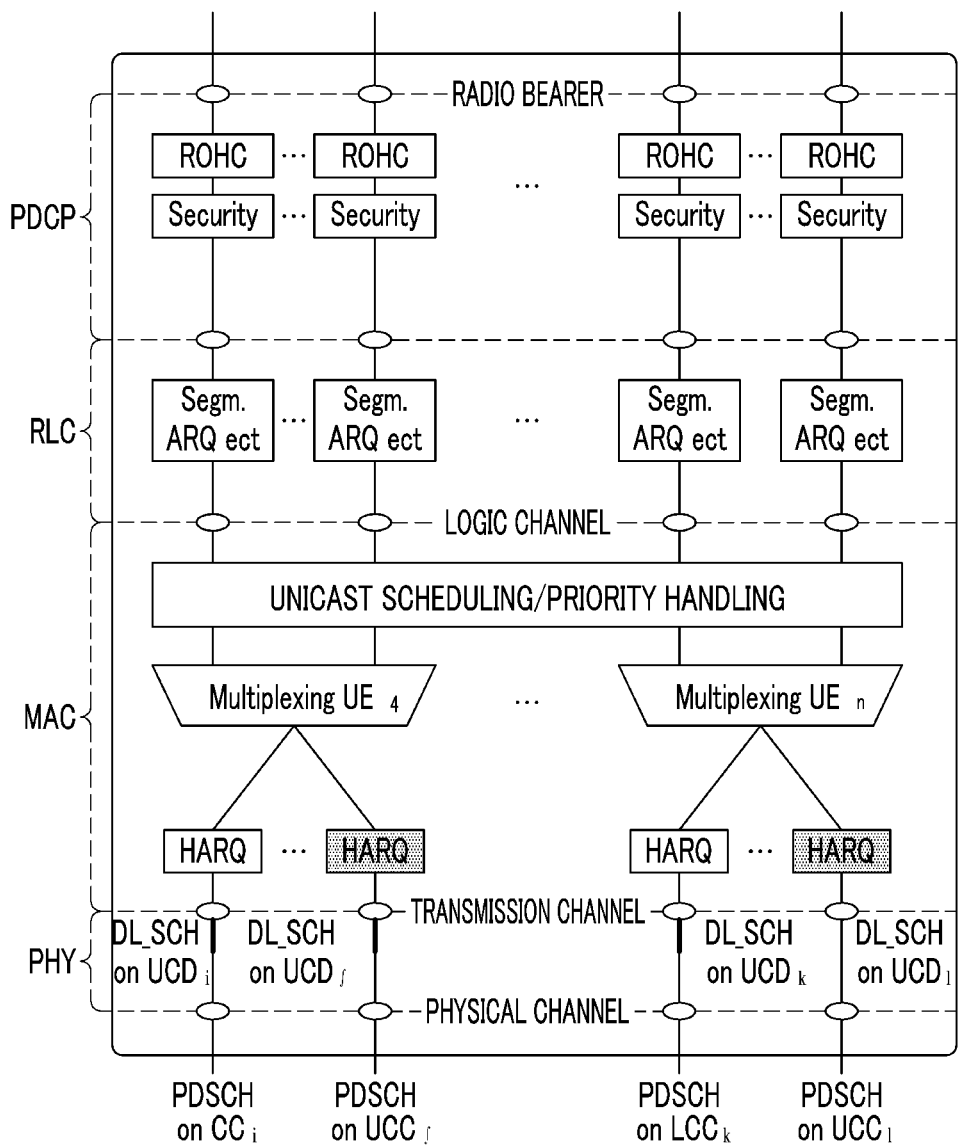
FIG. 3A is a diagram illustrating a downlink protocol stack of a wireless communication system according to an exemplary embodiment.
Figure 3B:
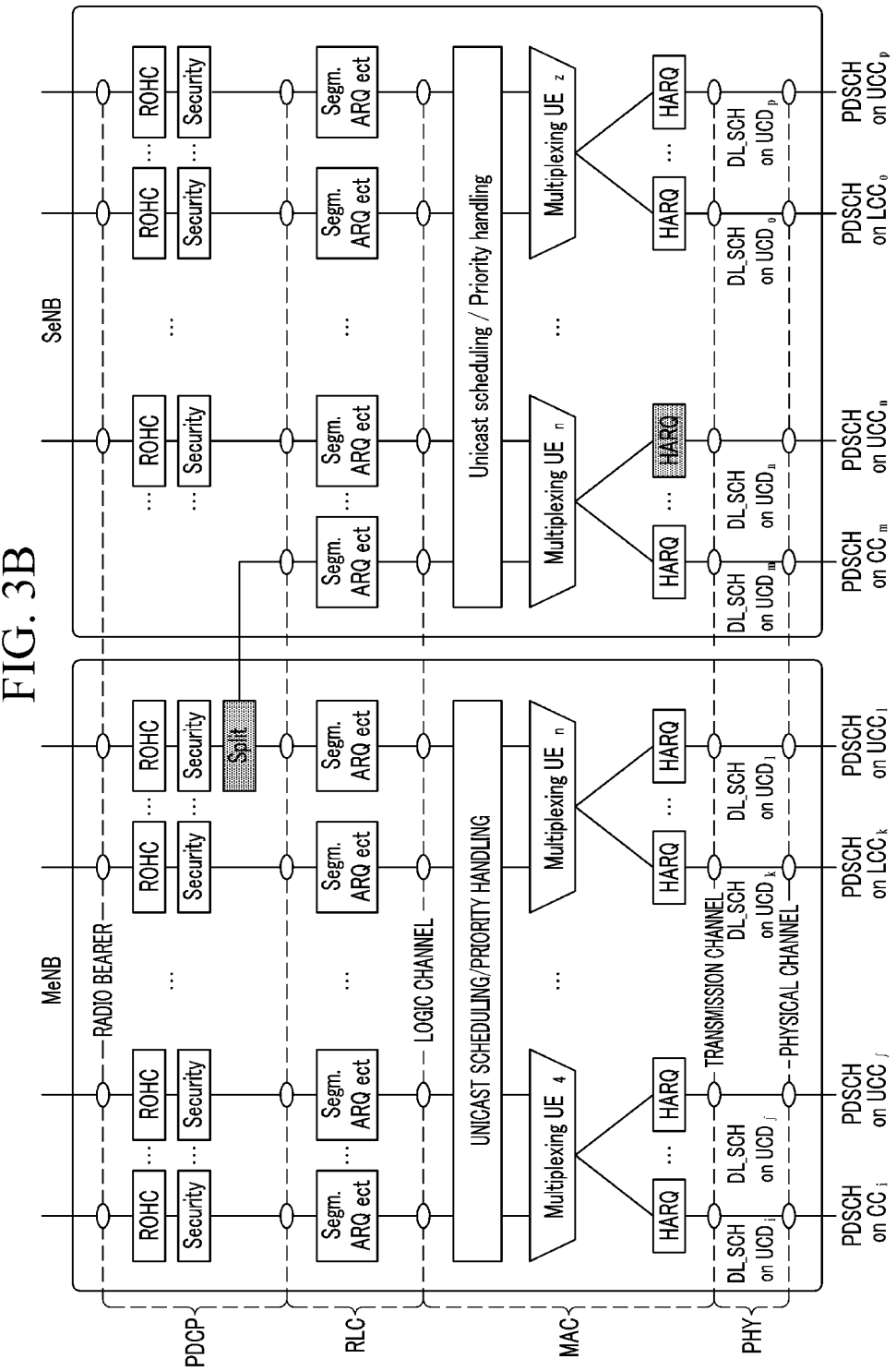
FIG. 3B is a diagram illustrating downlink protocol stacks of a master base station and a slave base station according to an exemplary embodiment.

FIG. 1 is a concept view illustrating processes of transmitting data of a base station and a terminal according to an exemplary embodiment, and FIGS. 2A and 2B are concept views illustrating a process of the HARQ retransmission according to an exemplary embodiment.

Referring to FIG. 1, the base station performs a clear channel assessment (CCA) in an unlicensed band and transmits data to the terminal. In this case, the base station may occupy a channel and may transmit the data (transmitted through an unlicensed component carrier (UCC)), for a channel occupancy time (COT) due to a result of CCA. However, in the case in which a negative acknowledgement (NACK) (transmitted through a licensed component carrier (LCC)) occurs for the data transmitted for the channel occupancy time, if a maximum channel occupancy time expires, a problem that the data corresponding to the NACK is not transmitted may occur. The reason is that the base station needs to again perform the CCA.

FIG. 2A is a concept view illustrating a case in which a cross-carrier scheduling is performed for an uplink, and FIG. 2B is a concept view illustrating a case in which a self-scheduling is performed for the uplink.

In FIG. 2A, in a case in which after the terminal performs the CCA and informs the base station about scheduling information through the uplink UCC, the NACK occurs for data transmitted through the LCC of the downlink from the base station to the terminal, since the COT allocated to the terminal exceeds, there is a problem that it is impossible to retransmit the data.

In FIG. 2B, in a case in which each of the terminal and the base station occupies the UCC through the CCA to transmit uplink (UL) grant and uplink data, if the NACK occurs for the UL grant or the uplink data, there is a problem that it is impossible to retransmit the UL grant or the uplink data after the COT.

Meanwhile, in order to improve a small cell of a cellular network considered in 3GPP, three scenarios associated with deployment, spectrum, traffic, and compatibility with a conventional standard of the small cell were defined, and technical issues and solutions for the defined scenarios were discussed. A scenario 1 is a scenario in which a macro cell and the small cell use the same frequency in a structure in which the macro cell and the small cell are overlapped with each other. A scenario 2 is a scenario in which the macro cell and the small cell use different frequencies in the structure in which the macro cell and the small cell are overlapped with each other. A scenario 3 is a scenario in which only a deployed small cell is used in a structure in which the macro cell and the small cell are not overlapped with each other.

In the present invention, in order to solve an HARQ retransmission problem of the unlicensed band, a method (method 1) for processing HARQ retransmission through the carrier in which previous data transmission is performed, a method (method 2) for processing HARQ retransmission through the LCC in the case in which the previous data transmission is performed through the UCC, a method (method 3) for processing HARQ retransmission through an available carrier among the LCC and the UCC in the case in which the previous data transmission is performed through the UCC, and a method (method 4) for processing HARQ retransmission according to a carrier change will be described. In order to solve the HARQ retransmission problem of the unlicensed band, two or more methods of the above listed methods may be combined, or after one method is applied, the other method may also be applied after a certain time, and other methods may be additionally set. Alternatively, information indicating at least one of the above-mentioned methods may be transferred through an upper layer (e.g., a radio resource control (RRC) layer level signaling of LTE, a media access control (MAC) layer control element (CE), or the like). Alternatively, at least one of the above-mentioned methods, which is predefined between the base station and the terminal, may be performed.

Figure 4:
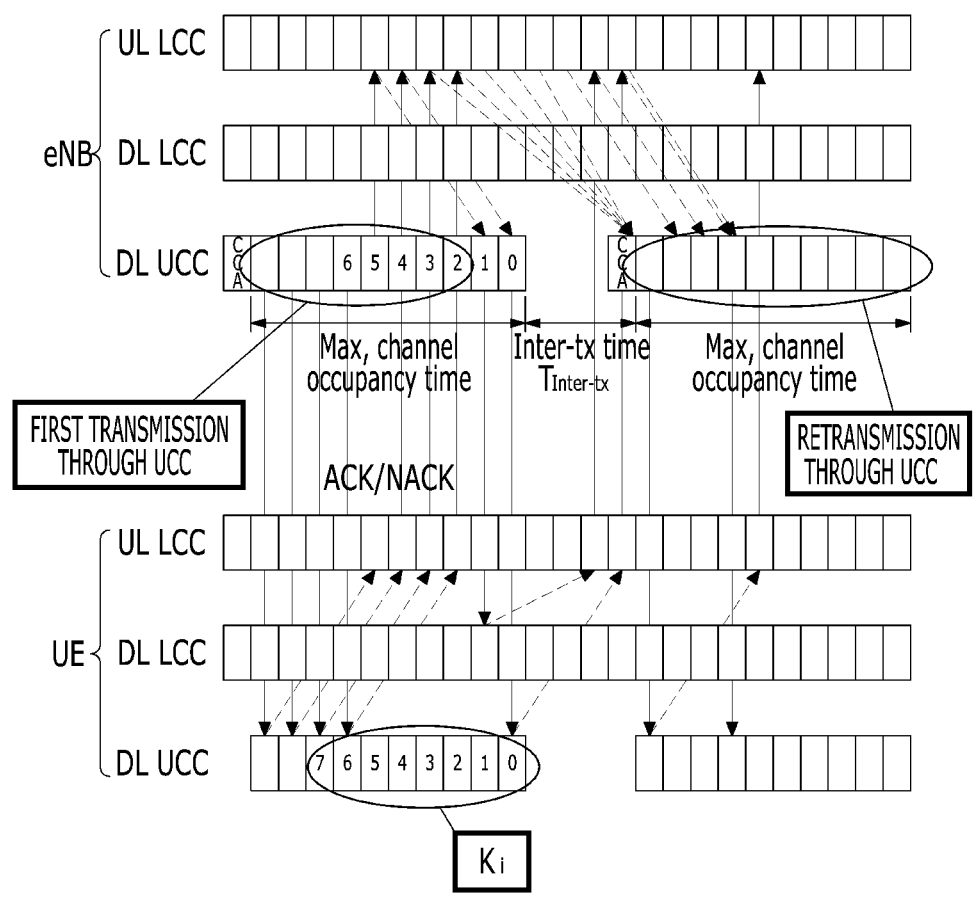
FIG. 4 is a concept view illustrating a process of the downlink HARQ retransmission of an unlicensed band of a method 1 according to an exemplary embodiment.

FIG. 4 is a concept view illustrating a process of the downlink HARQ retransmission of an unlicensed band of a method 1 according to an exemplary embodiment.

Referring to FIG. 4, the HARQ retransmission may be performed through the carriers used for an initial transmission of data (although this method is illustrated based on FDD, it may also be applied to TDD in the same way or similar way). If the present method is performed, a timing for the HARQ retransmission which is currently defined as LTE HARQ round trip time (RTT) needs to be changed as in the following Equation 1. In this case, the LTE HARQ RTT is 8 subframes in relation to FDD and is k+4 subframes in relation to TDD, k is a time delay or interval between a downlink transmission and an uplink feedback due to the downlink transmission, FDD is 4, and TDD may be varied depending on an UL/DL configuration (see 3GPP TS36.213).

If RTT>max_RTT,drop the data(fail to
transmit)→Re-initiate new transmission

Otherwise,HARQ RTT=min[{max{$k$+4,($Ki$%($k$+4))+
$T_{inter-tx}$}},max_RTT],  [Equation 1]

In Equation 1, Ki is an index counted from a last subframe included in the maximum COT, and $T_{inter-tx}$ denotes a time (a unit of subframe) between data transmission performed through a channel occupied after the CCA and data transmission through a channel occupied as a result of next CCA.

According to the method 1, in order to perform the HARQ retransmission, the CCA is additionally required, and this may cause a transmission delay. If the transmission delay exceeds a maximally allowable RTT (max_RTT), the data transmission fails and a new data transmission is attempted.

Referring to FIG. 4, since whether or not the channel is occupied is determined depending on the result of CCA, in a case in which the HARQ retransmission for data transmitted before a first subframe of a channel occupied after a second CCA is performed, a plurality of retransmissions may occur in the first subframe.

Figure 5:
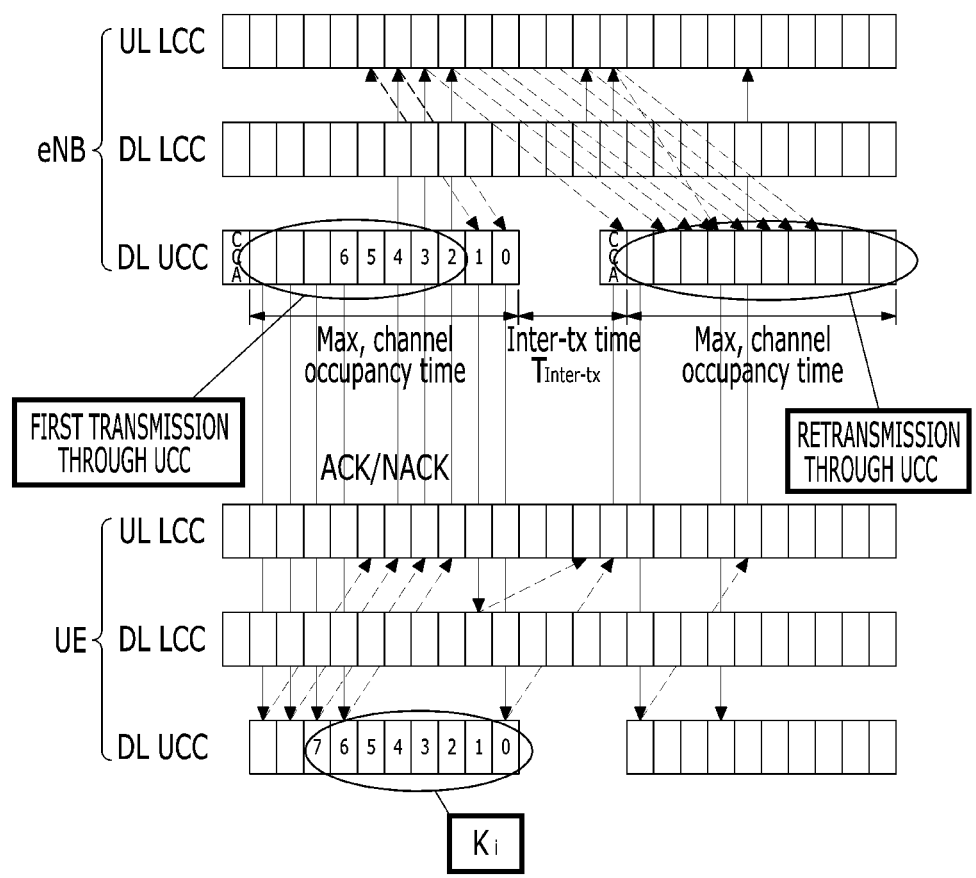
FIG. 5 is a concept view illustrating a process of the downlink HARQ retransmission of an unlicensed band of a method 1 according to another exemplary embodiment.

FIG. 5 is a concept view illustrating a process of the downlink HARQ retransmission of an unlicensed band of a method 1 according to another exemplary embodiment.

Referring to FIG. 5, in a case in which the channel is not occupied at a retransmission timing, after the subframe corresponding to the retransmission is sequentially extended, the HARQ retransmission may be performed. In this case, as the retransmission timing, k of the unlicensed band, which is defined as a value defined in the cellular system (k=4 of a case of FDD of 3GPP) or a value defined in an existing FDD/TDD, may be used. In addition, in this case, the subframe k is sequentially extended and is then set as a subframe k' as in the following Equation 2, such that the HARQ retransmission may be performed.

$k'=k+T_{inter-tx}$  [Equation 2]

In Equation 2, $T_{inter-tx}$ is a time (a unit of subframe) until the data is transmitted through the channel occupied as the result of next CCA after the data is transmitted to the channel occupied by the CCA. In addition, according to the following Equation 3, a timing for the HARQ retransmission is determined.

If RTT>max_RTT,drop the data(fail to
transmit)→Re-initiate new transmission

Otherwise,HARQ RTT=min[{max{$k'$+4,($Ki$%($k$+4))+
$T_{inter-tx}$}},max_RTT]  [Equation 3]

Figure 6:
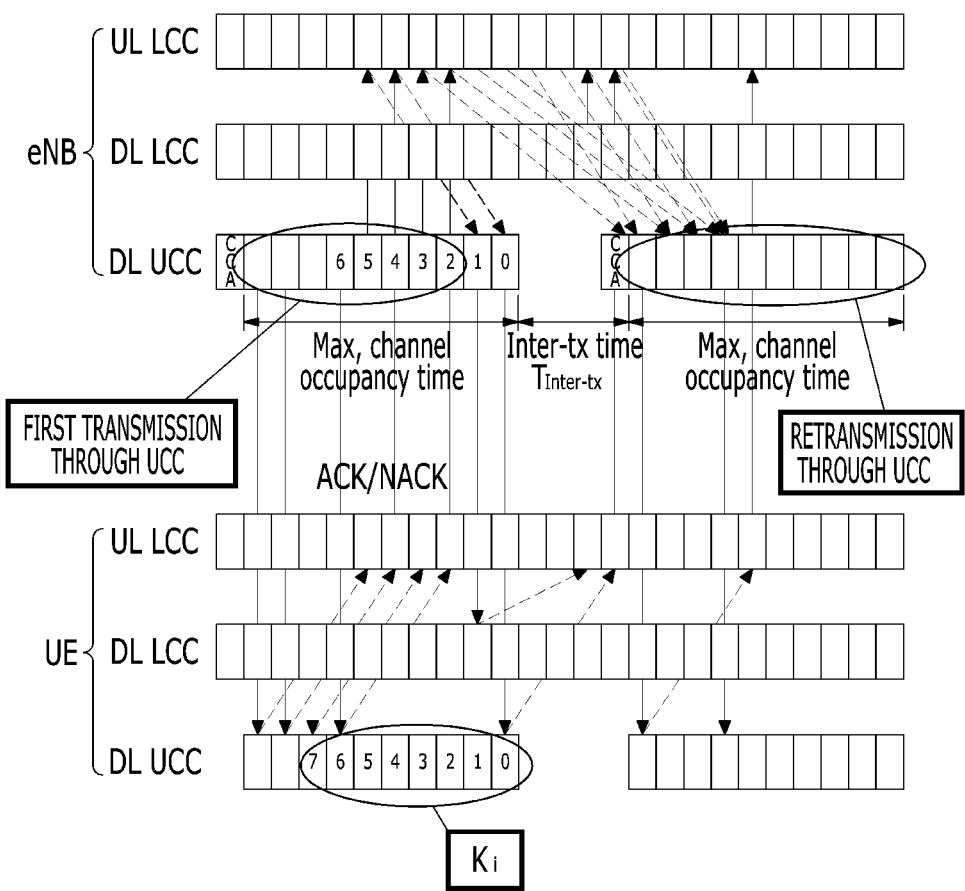
FIG. 6 is a concept view illustrating a process of the downlink HARQ retransmission of an unlicensed band of a method 1 according to another exemplary embodiment.

FIG. 6 is a concept view illustrating a process of the downlink HARQ retransmission of an unlicensed band of a method 1 according to another exemplary embodiment.

Referring to FIG. 6, in a case in which the channel is not occupied at a timing at which the HARQ retransmission needs to be performed, if the corresponding channel is occupied at a timing at which the data is retransmitted after the retransmission is performed similar to FIG. 5, the retransmission to the corresponding subframe at a timing of the corresponding HARQ retransmission may be performed.

Although FIGS. 4 to 6 describe the HARQ retransmission method in relation to a downlink data, the method described in FIGS. 4 to 6 may be applied to the HARQ retransmission for an uplink data transmission in the same way or similar way. In the case of the uplink data transmission, a feedback interval (e.g., physical HARQ indicator channel (PHICH) of 3GPP) transmitted from the base station to the terminal may be $k_{PHICH}$.

Figure 7A:
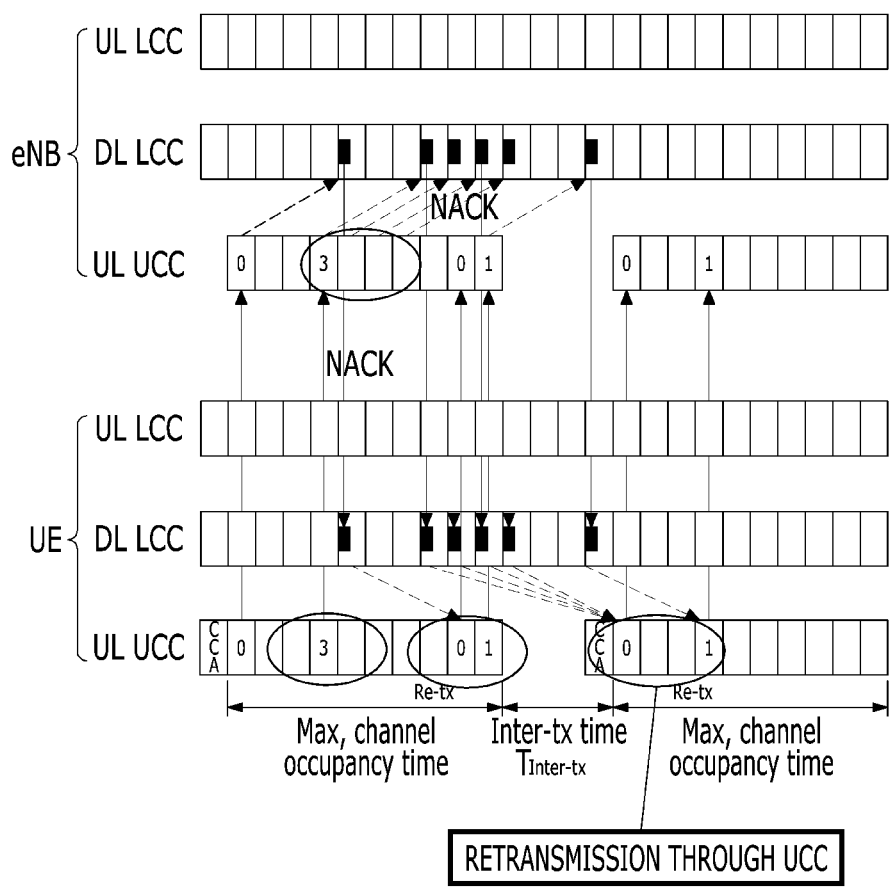
FIGS. 7A to 7C are concept views illustrating processes of the uplink HARQ retransmission of an unlicensed band of a method 1 according to an exemplary embodiment.
Figure 7B:
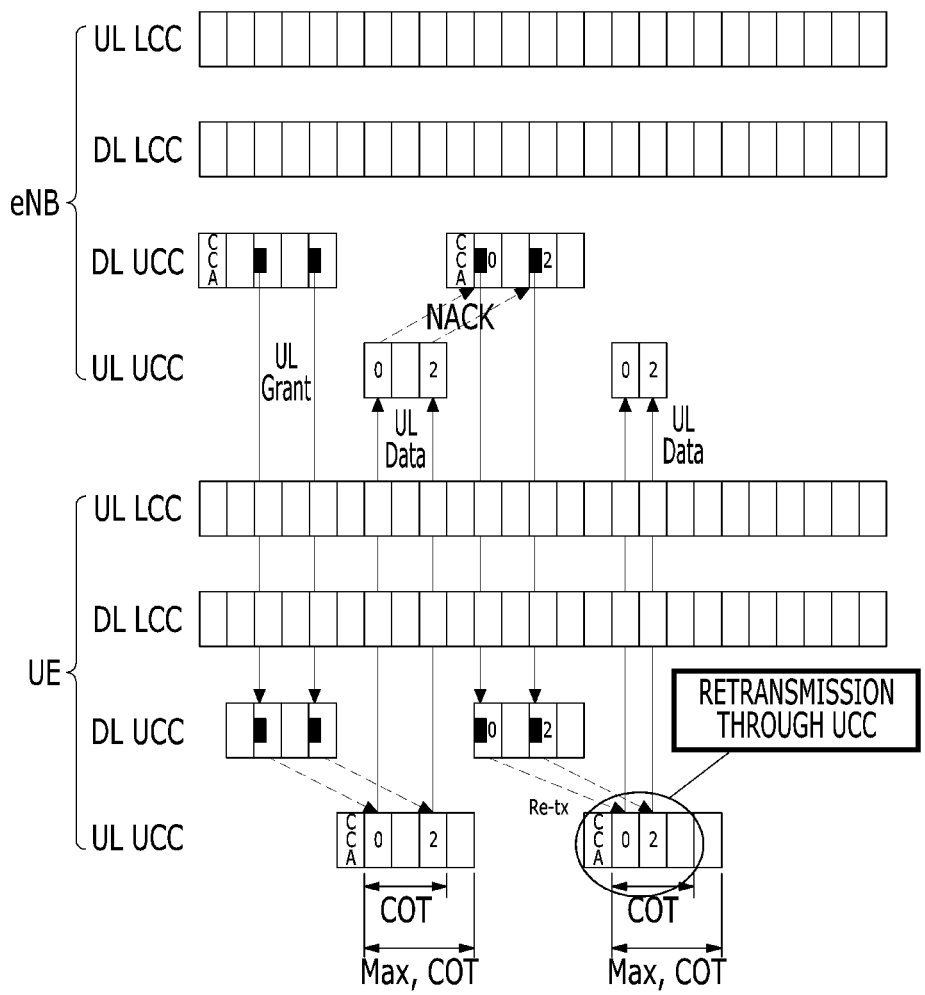
Figure 7C:
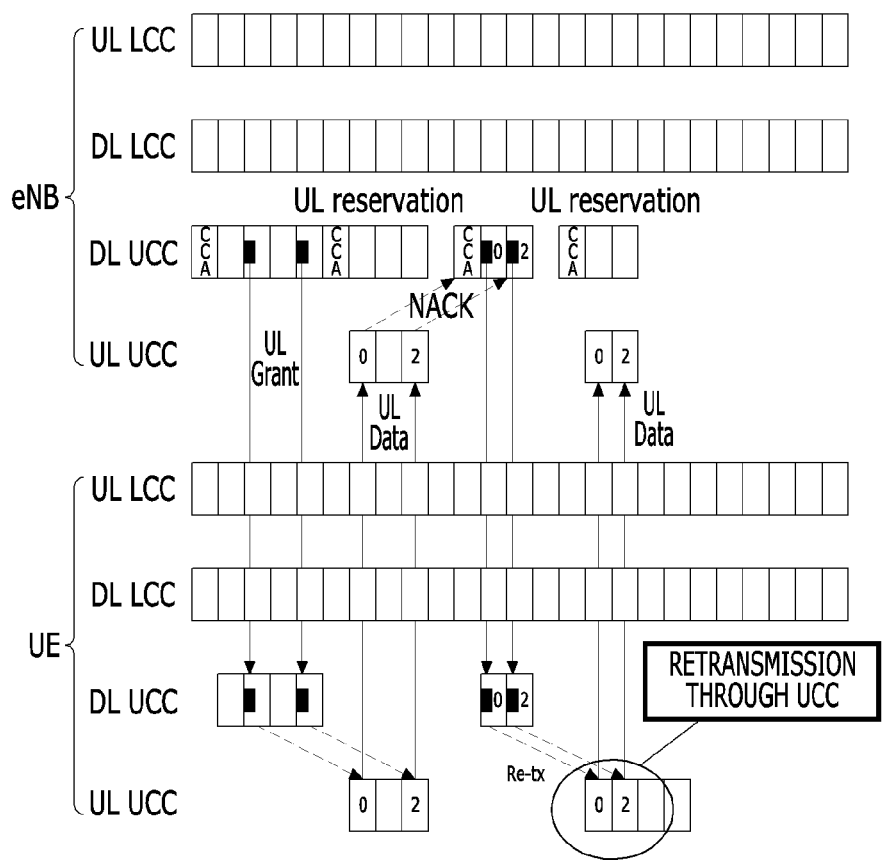

FIGS. 7A to 7C are concept views illustrating processes of the uplink HARQ retransmission of an unlicensed band of a method 1 according to an exemplary embodiment.

FIG. 7A illustrates a case in which the resources are allocated to the uplink by the cross-carrier scheduling, and FIGS. 7B and 7C illustrate cases in which the resources are allocated to the uplink by the self-scheduling. In FIG. 7B, the terminal performs the CCA to transmit the uplink data and accesses the channel, and then occupy the channel (holding or reservation for the channel), and in FIG. 7C, the base station performs the CCA to transmit the uplink data of the terminal and performs the access/occupy for the channel. The process of the uplink HARQ retransmission of the unlicensed band may be the same as or similar to the case in which the retransmission is performed by the same carrier as the previous carrier.

Figure 8:
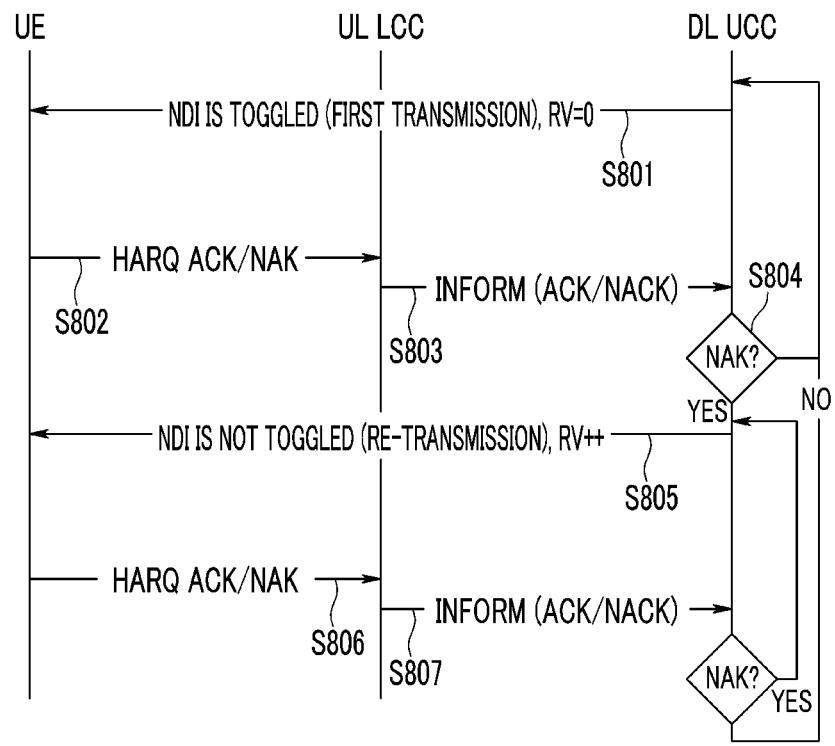
FIG. 8 is a flowchart illustrating a process of the downlink HARQ retransmission of a method 1 according to an exemplary embodiment.

FIG. 8 is a flowchart illustrating a process of the downlink HARQ retransmission of a method 1 according to an exemplary embodiment.

Referring to FIG. 8, first, the base station transmits the downlink data together with a new data indicator (NDI) (NDI is toggled) to the terminal through the UCC (S801). In this case, a redundancy version (RV) is 0 (RV=0). Thereafter, the terminal receiving the downlink data transmits HARQ ACK/NACK to the base station through the LCC (S802). In addition, the base station informs an UCC cell about ACK/NACK of the terminal (S803), and if the terminal does not transmit NACK, the UCC cell transmits new data to the downlink (S804). However, if the terminal transmits NACK, the base station increases the redundancy version (RV++), and again transmits data corresponding to NACK without NDI toggle (NDI is not toggled) through the UCC (S805). Next, the terminal transmits HARQ ACK/NACK to the base station through the LCC (S806), and the base station informs the UCC cell about ACK/NACK of the terminal (S807). That is, according to an exemplary embodiment, HARQ ACK/NACK that informs whether or not the data transmitted through the unlicensed band is successfully transmitted may be transmitted to the base station through the licensed band, and in this case, the HARQ retransmission may be performed using the carrier used for the previous data transmission.

Hereinafter, a method (method 2) for processing HARQ retransmission through the LCC when the previous data transmission is performed through the UCC will be described in detail with reference to FIGS. 9 to 11.

Figure 9:
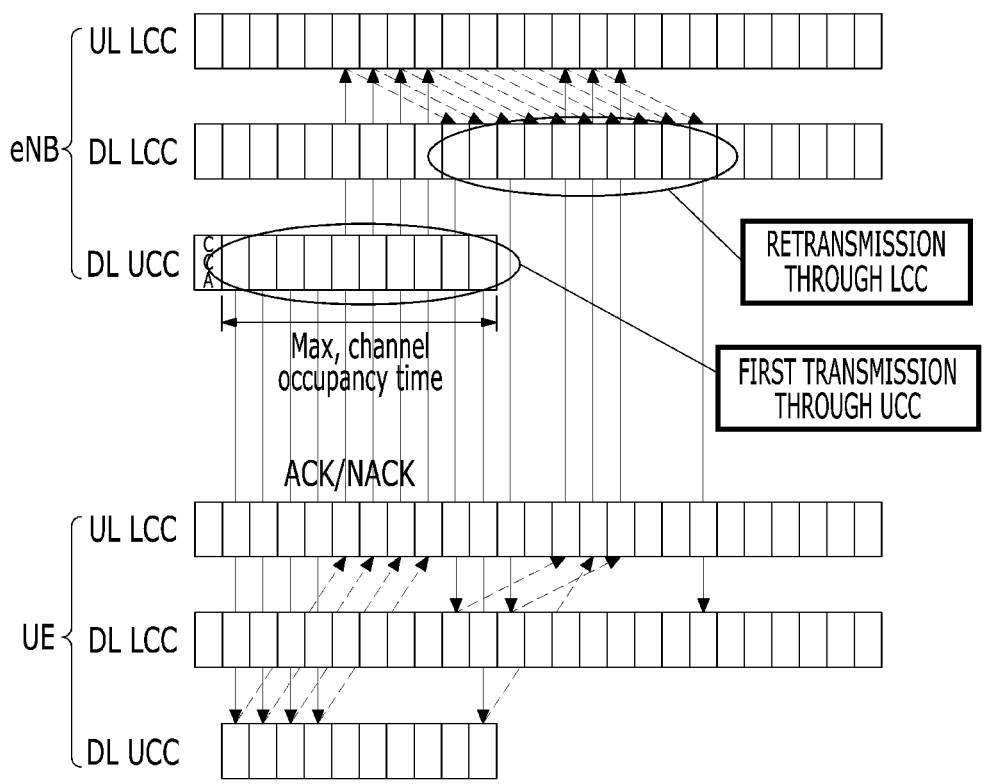
FIG. 9 is a concept view illustrating a process of the downlink HARQ retransmission of an unlicensed band of a method 2 according to an exemplary embodiment.

FIG. 9 is a concept view illustrating a process of the downlink HARQ retransmission of an unlicensed band of a method 2 according to an exemplary embodiment.

Referring to FIG. 9, the initial transmission of the data is performed in the unlicensed band, the HARQ retransmission is performed in the licensed band. Although FIG. 9 illustrates the process of the HARQ retransmission in relation to the FDD system, the process of the HARQ retransmission may be applied to the TDD in the same way or similar way. According to the method 2, the additional CCA for the HARQ retransmission is not required, and the HARQ RTT time is not reset. That is, a feedback for the data after receiving the data is performed in a given resource, and the retransmission is performed when the feedback is NACK. However, in this case, since the retransmission of the data is performed through the licensed band carrier, the terminal receives a control channel of the licensed band, and performs a pre-operation for a data reception (in case of an uplink data transmission, a data transmission). In addition, in a case in which data (first data) initially transmitted/ retransmitted in the licensed band, and licensed band retransmission data (second data) corresponding to data transmitted in the unlicensed band are simultaneously transmitted in the same subframe, the first data and the second data should be distinguished from each other.

In order to distinguish the first data and the second data from each other, a method for expanding an HARQ process may be used.

In this case, depending on operation characteristics of the HARQ process independently operated for each of the carriers, separate HARQ process identification (ID) different from the HARQ process ID allocated (given) to a primary cell (PCell) may be defined/allocated. The respective cases are not distinguished by the HARQ process ID (or index) for each of the carriers.

Alternatively, the respective cases may be distinguished by adding bits for the unlicensed band carrier to an existing HARQ process ID. For example, the HARQ process ID, which is 3 bits in the FDD system, may be changed to 3+N bits, and the HARQ process ID, which is 4 bits in the TDD system, may be changed to 4+N bits. Here, N is the number of unlicensed band carriers. For example, in a case in which the unlicensed band carrier of the FDD system is 1, 4 bits may be used as the HARQ process ID, 0b0000 to 0b0111 may be used as the HARQ process ID of the licensed band carrier, and 0b1000 to 0b1111 may be used as the HARQ process ID of the unlicensed band carrier. Alternatively, in a case in which the unlicensed band carrier of the FDD system is 2, 5 bits may be used as the HARQ process ID, 0b00000 to 0b00111 may be used as the HARQ process ID of the licensed band carrier, 0b01000-0b01111 may be used as the HARQ process ID of a first unlicensed band carrier, and 0b10000 to 0b10111 may be used as the HARQ process ID of a second unlicensed band carrier. This method may also be applied to the TDD system in the same way as the FDD system, but 4 bits are used as the HARQ process ID of the licensed band carrier.

In a case in which the HARQ process is extended, a change and an extension of information related to HARQ among information included in a control channel for data transmission/retransmission (e.g., enhanced (E) physical downlink control channel (PDCCH) of 3GPP) are required.

Alternatively, in order to distinguish the first data and the second data from each other, a method for identifying the HARQ process may be used. This method is a method in which a predetermined bit of bits of the HARQ process ID is used as a carrier index. That is, according to this method, an identifier of the unlicensed band carrier (e.g., a carrier indicator) may be used as the carrier index, or an HARQ dedicated identifier in which the identifier of the unlicensed band carrier is aligned in the order from a small value to a large value may be newly defined. In this case, the carrier identifier or the redefined carrier identifier may be used to identify the HARQ process, and may also be used as an identifier for a cellular operation in the unlicensed band (e.g., an identifier for indicating a carrier for a resource allocation, carrier addition/allocation/activation/deactivation/creation/removal, indicating a carrier successful in CCA, indicating a target channel (or carrier) for changing the channel (or carrier), and the like). In addition, the carrier identifier according to the present method may be mapped using a carrier indicator among fields included in DCI used for the resource allocation in the carrier aggregation of 3GPP. In addition, the carrier identifier may be added even in a case in which the carrier indictor is included to a condition included in the cross-carrier scheduling, and a case in which data allocation information/retransmission information corresponding to the data transmitted in the unlicensed band is indicated.

Alternatively, in order to distinguish the first data and the second data from each other, a method for indicating the data transmission (resource allocation indication) may be changed. According to the above-mentioned method, in a case in which the data is transmitted/allocated in the cellular system, the data included in the carrier identifier for informing a receiver about the transmission/allocation of the data and retransmitted identifies the carriers used for a previous transmission, thereby making it possible to perform the HARQ process.

Based on the method for identifying the HARQ process described above, the carriers used for the previous transmission are identified at the time of allocating/indicating the resource through the carrier (license) for which the retransmission is performed, thereby making it possible to operate the HARQ process.

Figure 10A:
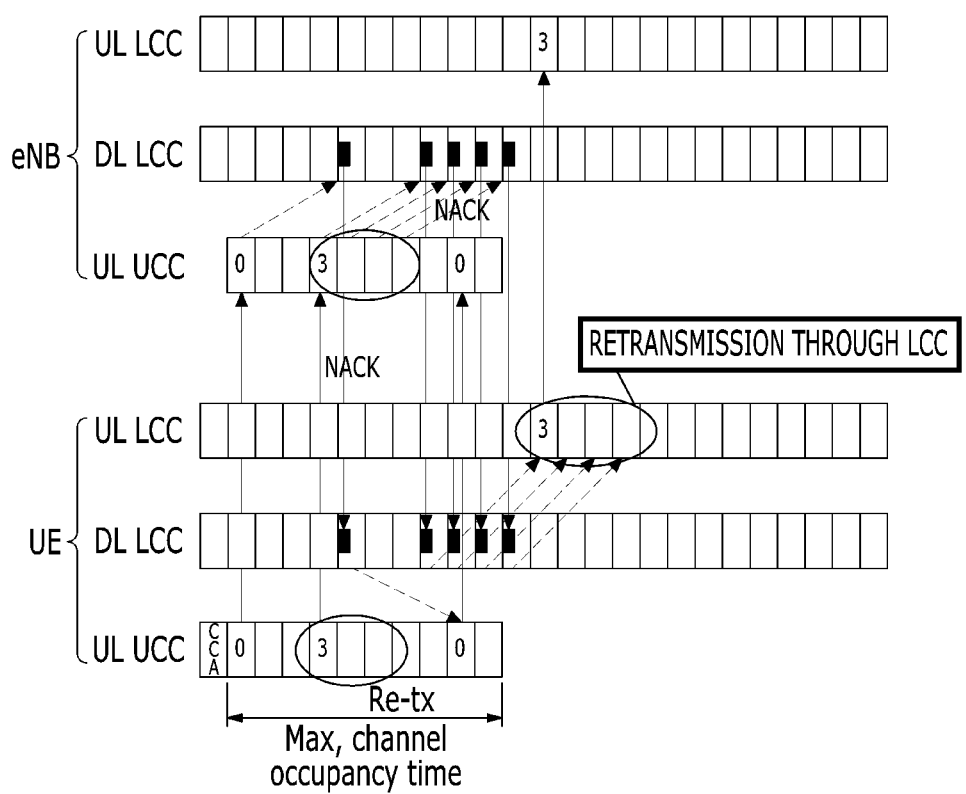
FIGS. 10A to 10C are concept views illustrating processes of the uplink HARQ retransmission of an unlicensed band of a method 2 according to an exemplary embodiment.
Figure 10B:
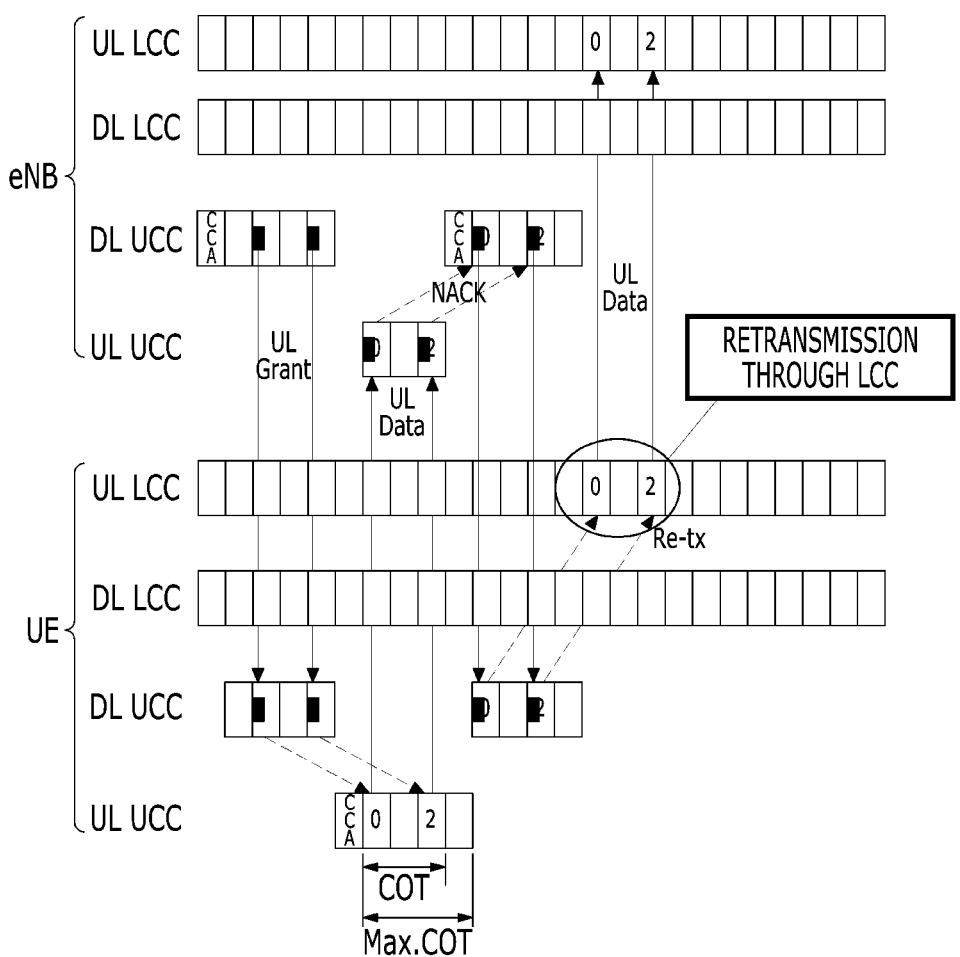
Figure 10C:
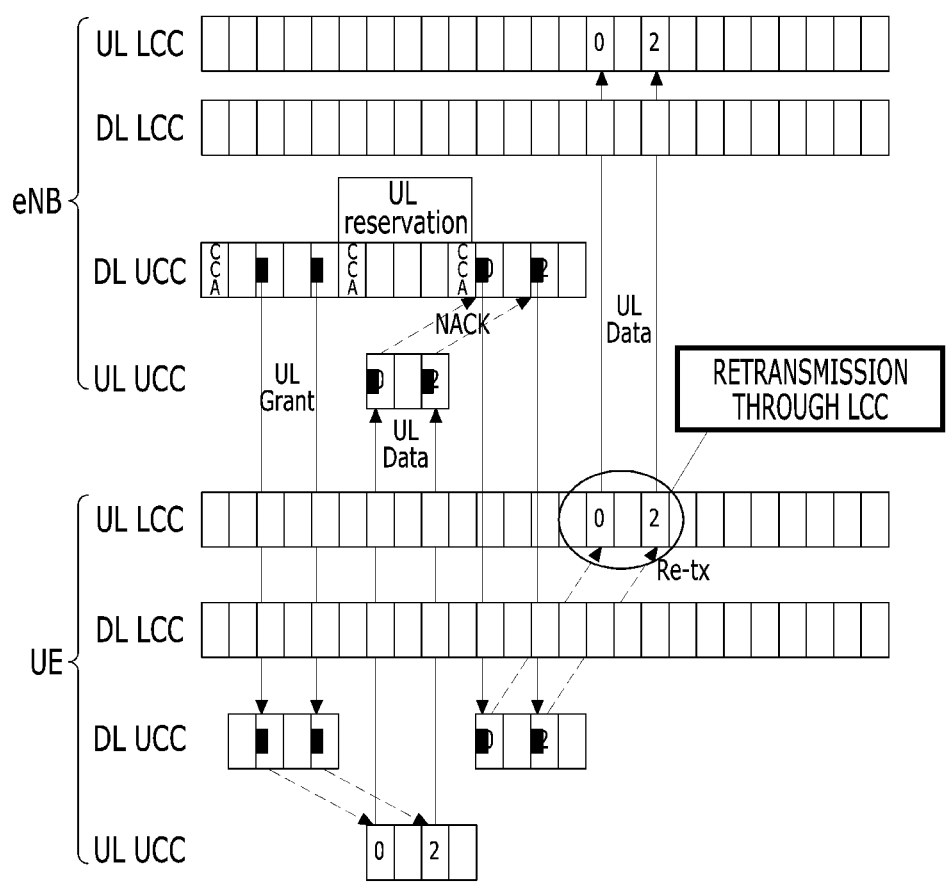

FIGS. 10A to 10C are concept views illustrating processes of the uplink HARQ retransmission of an unlicensed band of a method 2 according to an exemplary embodiment.

Referring to FIGS. 10A to 10O, the method for identifying the HARQ process described above may also be applied to an uplink data service.

FIG. 10A illustrates a case in which the resources are allocated by the cross-carrier scheduling, and FIGS. 10B and 10C illustrate cases in which the resources are allocated by the self-scheduling. In FIG. 10B, the terminal performs the access/occupy for the channel through the CCA to transmit the uplink data, and in FIG. 10C, the base station performs the access/occupy for the channel through the CCA to transmit the uplink data of the terminal. Additionally, in the case of the self-scheduling as in FIGS. 10B and 10C, if the data transmission is performed by the same carrier as the carrier used for the indication of the resource allocation information for the initial data transmission, the HARQ ACK/NACK (e.g., PHICH of 3GPP) corresponding to the data may be transmitted through the carrier used for the indication of the resource allocation information. In order for the base station to transmit the HARQ ACK/NACK using the unlicensed band, the base station should perform the access/occupy for the channel through the CCA. In general, an HARQ ACK/NACK feedback may be transmitted after a predetermined time (e.g., in the case of FDD, after 4 ms, and in the case of TDD, 4 to 7 ms, see 3GPP TS36.213) lapses after the data transmission. However, in a case in which the CCA is performed before a timing at which the channel is occupied and the data needs to be transmitted, or it is determined that the channel is already used (busy or occupied) as the result of CCA, the base station may not transmit the HARQ ACK/NACK. To this end, one or a combination of two or more of the following methods may be used.

The base station may transmit the HARQ ACK/NACK through the licensed band in which the retransmission is performed.

Alternatively, if the transmission is successfully performed, the base station may omit the HARQ ACK/NACK feedback.

Alternatively, in a case in which the HARQ ACK/NACK is not transmitted, and the resource allocation to the terminal is performed through the licensed band in which the retransmission is performed, the base station may include information capable of indicating the retransmission of the previous data (i.e., information requesting the retransmission of the data) in the resource allocation so that the terminal may know whether or not the date is retransmitted, or may set a parameter for the HARQ retransmission at the time of allocating the resource for the HARQ retransmission.

Figure 11:
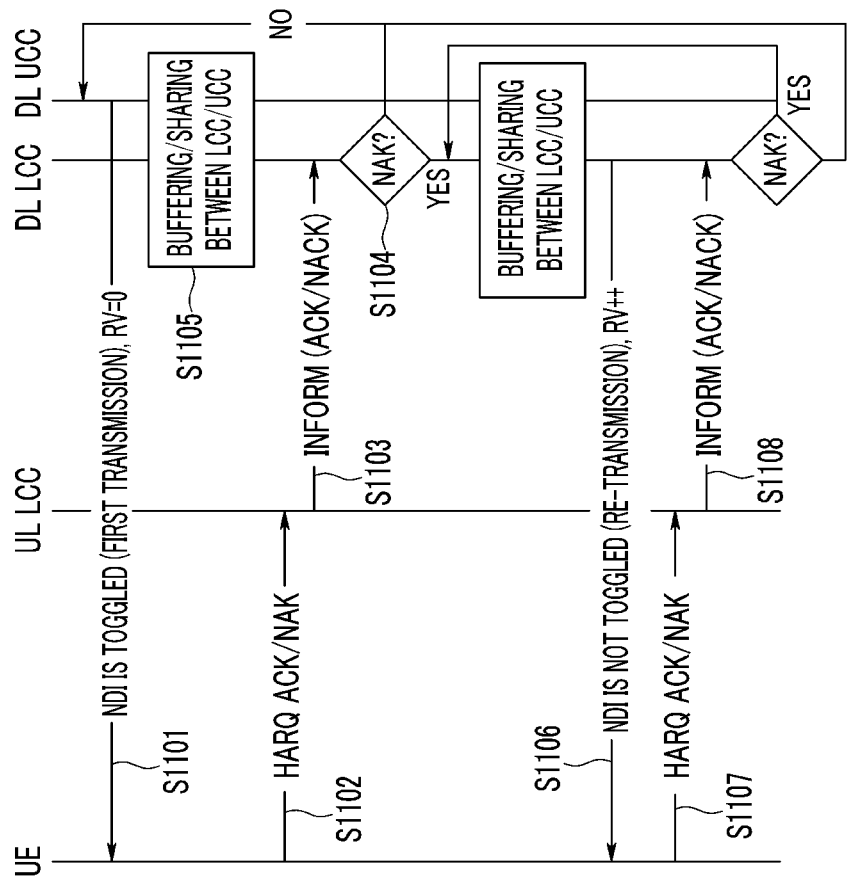
FIG. 11 is a flowchart illustrating a process of the downlink HARQ retransmission of a method 2 according to an exemplary embodiment.

FIG. 11 is a flowchart illustrating a process of the downlink HARQ retransmission of a method 2 according to an exemplary embodiment.

Referring to FIG. 11, first, the base station transmits the downlink data together with a (toggled) new data indicator (NDI) (NDI is toggled) to the terminal through the UCC (S1101). In this case, a redundancy version (RV) is 0 (RV=0). Thereafter, the terminal receiving the downlink data transmits the HARQ ACK/NACK to the base station through the LCC (S1102). In addition, the base station informs an LCC cell about ACK/NACK of the terminal (S1103), and the LCC cell determines whether or not the terminal transmits NACK (S1104).

If the terminal transmits ACK (i.e., does not transmit NACK), new data is again transmitted to the downlink through the UCC (S1105). However, if the terminal transmits NACK, a buffering/sharing is performed between a downlink LCC and a downlink UCC (S1106), the base station increases the redundancy version (RV++), and again transmits data corresponding to NACK without NDI toggle (NDI is not toggled) through the LCC (S1107). Next, the terminal transmits the HARQ ACK/NACK to the base station through the LCC (S1108), and the HARQ ACK/NACK of the terminal is informed to the LCC cell (S1109). That is, according to an exemplary embodiment, HARQ ACK/NACK that informs whether or not the data transmitted through the unlicensed band is successfully transmitted may be transmitted to the base station through the licensed band, and in this case, the HARQ retransmission may also be performed through the licensed band.

Figure 12:
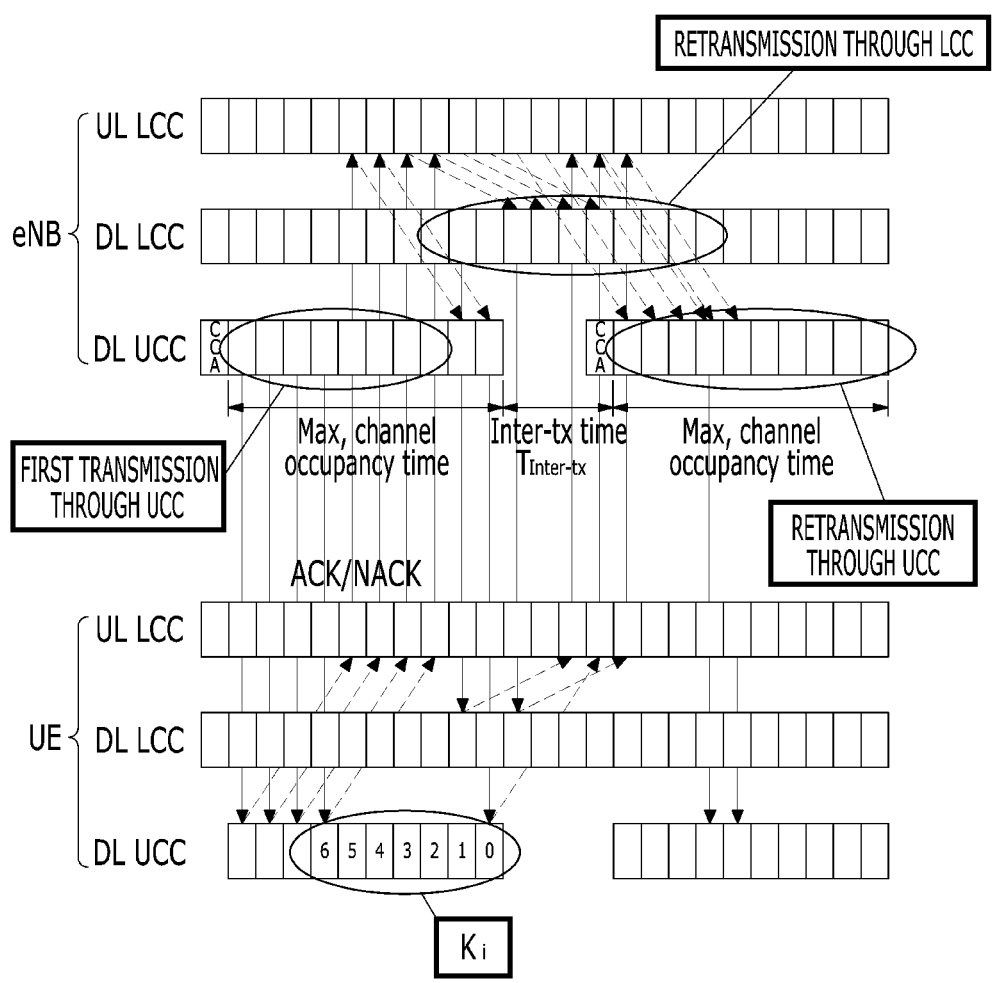
FIG. 12 is a concept view illustrating a process of the downlink HARQ retransmission of an unlicensed band of a method 3 according to an exemplary embodiment.

FIG. 12 is a concept view illustrating a process of the downlink HARQ retransmission of an unlicensed band of a method 3 according to an exemplary embodiment.

Referring to FIG. 12, the initial data is transmitted through the unlicensed band, and thereafter, the HARQ retransmission is performed through the carrier (the carrier used for the previous data transmission among the licensed band/unlicensed band or other carriers of the unlicensed band) available at an HARQ retransmission timing (although FIG. 12 is illustrated in relation to the FDD system, it may be applied to the TDD system in the same way or similar way). In the method 3, an additional CCA (method 1) for retransmission may be performed, the retransmission (method 2) using the licensed band may also be performed, and the data retransmission may also be performed in the occupied channel through still another CCA (third CCA) performed for the data transmission.

To this end, in the method 3, the HARQ process needs to be distinguished, and the method defined in the method 2 may be applied. In this case, the feedback for the data after receiving the data is performed in a given time and frequency resource, the retransmission is performed when the feedback is NACK, and the terminal may take an operation for receiving the licensed band control channel and the data (in the case of the uplink data transmission, transmitting the data) and an operation for receiving the unlicensed band control channel and the data so that the data is retransmitted through the same carrier as or carrier different from the previous carrier (a licensed or a third unlicensed). In a case in which the data retransmission is performed through the same carrier as the carrier used for the previous data transmission, the method 1 may be performed.

Figure 13A:
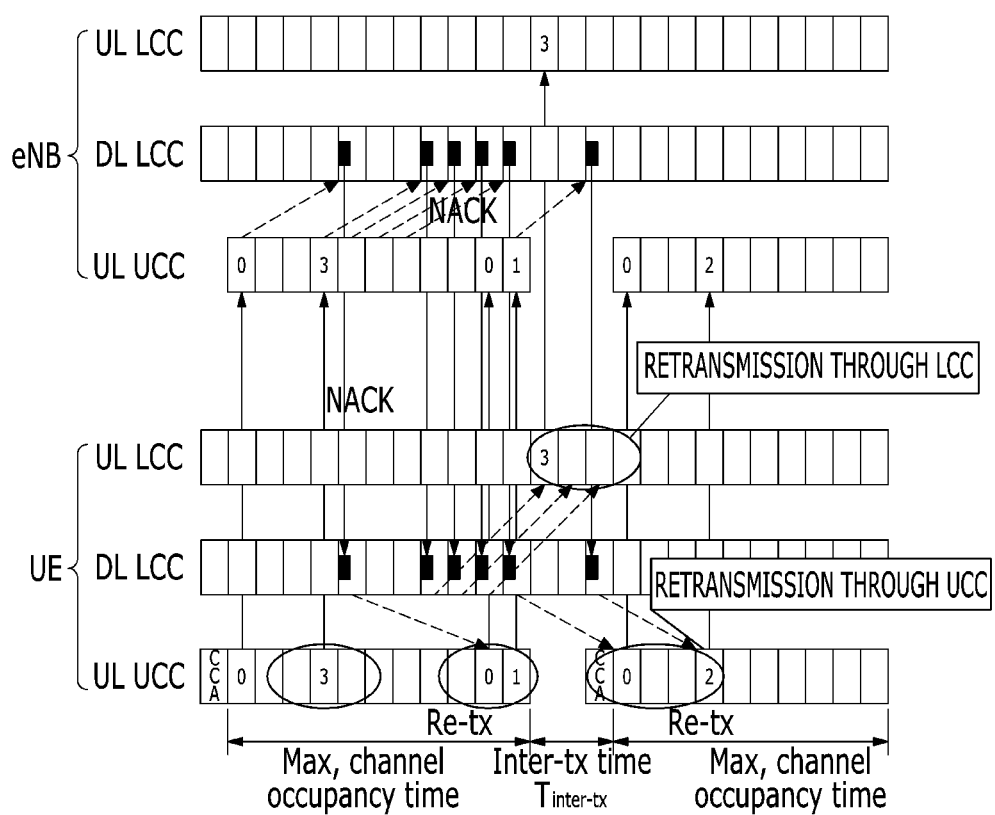
FIGS. 13A to 13C are concept views illustrating processes of the uplink HARQ retransmission of an unlicensed band of a method 3 according to an exemplary embodiment.
Figure 13B:
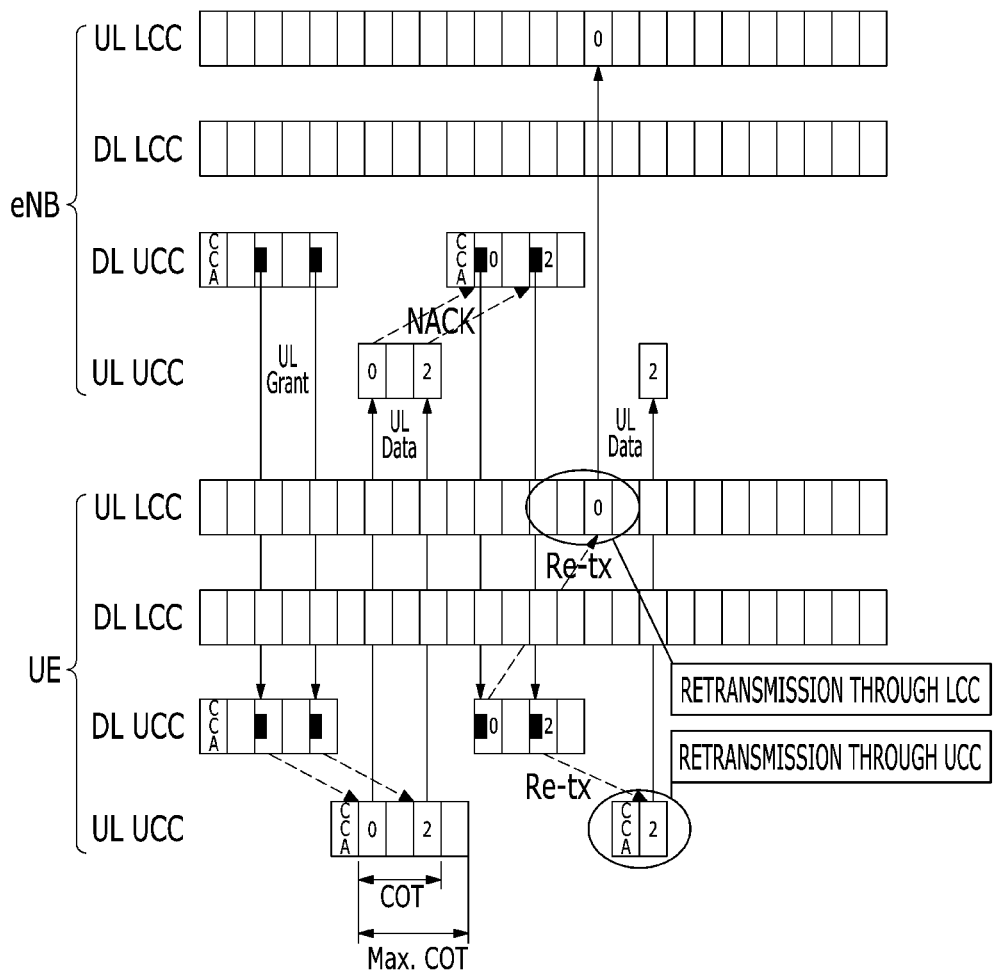
Figure 13C:
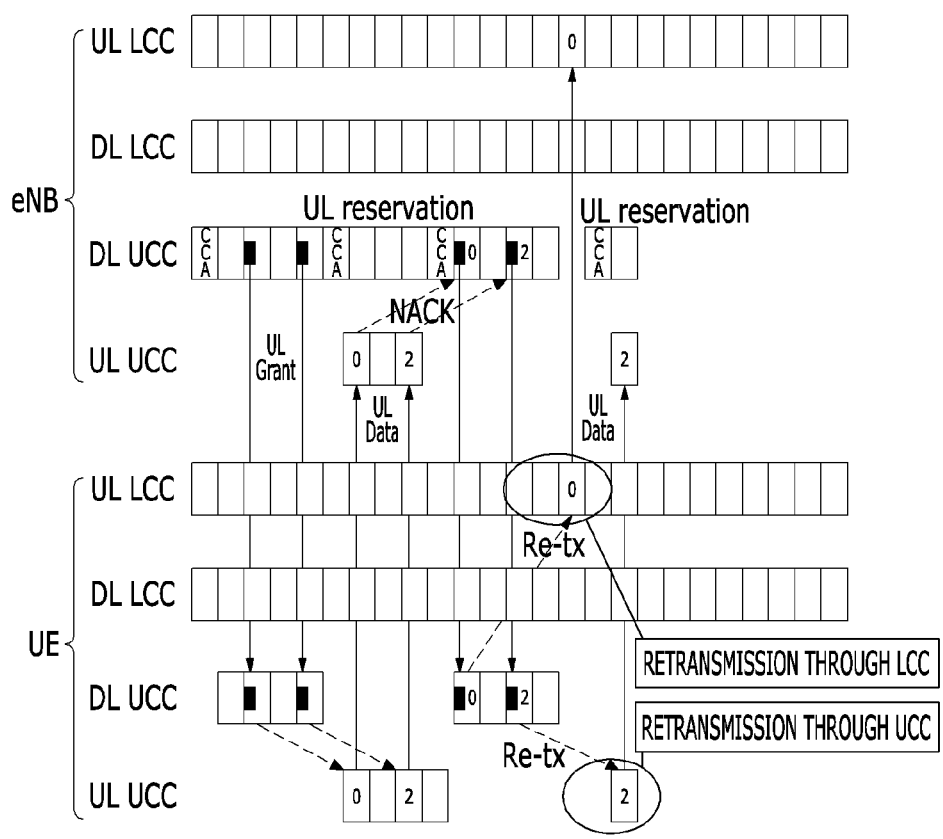

FIGS. 13A to 13C are concept views illustrating processes of the uplink HARQ retransmission of an unlicensed band of a method 3 according to an exemplary embodiment.

The process of the HARQ retransmission of the unlicensed band according to the method 3 may be applied to the uplink as well as the downlink. In this case, the uplink data service also includes a case in which the data retransmission continues to be performed through the carrier used for the previous data transmission, and since the application of the method 3 to an uplink HARQ process is similar to the case of the downlink, a detailed description thereof will be omitted.

FIG. 13A illustrates a case in which the resources are allocated by the cross-carrier scheduling, and FIGS. 13B and 13C illustrate cases in which the resources are allocated by the self-scheduling.

In this case, in FIG. 13B, the terminal performs the access/occupy for the channel by performing the CCA to transmit the uplink data, and in FIG. 13C, the base station performs the access/occupy for the channel through the CCA to transmit the uplink data of the terminal. In the case of the self-scheduling of FIGS. 13B and 13C, if the data transmission is performed through a first carrier used to indicate the resource allocation information for the data transmission, the HARQ ACK/NACK for the transmitted data (e.g., PHICH of 3GPP) may pass through the carrier used to indicate the resource allocation information. However, In order for the base station to transmit the HARQ ACK/NACK using the unlicensed band, the base station should perform the access/occupy for the channel by performing the CCA. In general, the HARQ ACK/NACK feedback is performed at a certain time (e.g., after 4 ms in the case of the FDD system, and in the case of the TDD system, 4 to 7 ms) after the data transmission. The CCA is generally performed before a timing at which the channel is occupied and the data needs to be transmitted, but when it is determined that the channel is already used (busy or occupied) as the result of CCA, the base station may not transmit the HARQ ACK/NACK using the unlicensed band. In order to allow the base station to transmit the HARQ ACK/NACK even in the case in which the channel of the unlicensed band is used as the result of CCA, one or a combination of two or more of the following four methods may be used.

1. The HARQ ACK/NACK is transmitted by a carrier selected from the licensed/unlicensed band in which the retransmission is performed 2. The HARQ ACK/NACK is transmitted by the carrier of the licensed band, independently from the carrier in which the retransmission is performed 3. In the case in which the data is successfully transmitted, the HARQ ACK/NACK feedback is omitted (the present method may also be applied to the case of the method 1)

4. Instead of transmitting the HARQ ACK/NACK, in the case in which the resource is allocated through the carrier in which the data retransmission is performed, a fact that the resource is the resource for the retransmission of the previous data may be included in the resource allocation, or the terminal may determine whether or not the HARQ retransmission is performed, using the parameter set for the HARQ retransmission at the time of allocating the resource for the HARQ retransmission (the present method may also be applied to the case in which the method 1 is performed)

Figure 14:
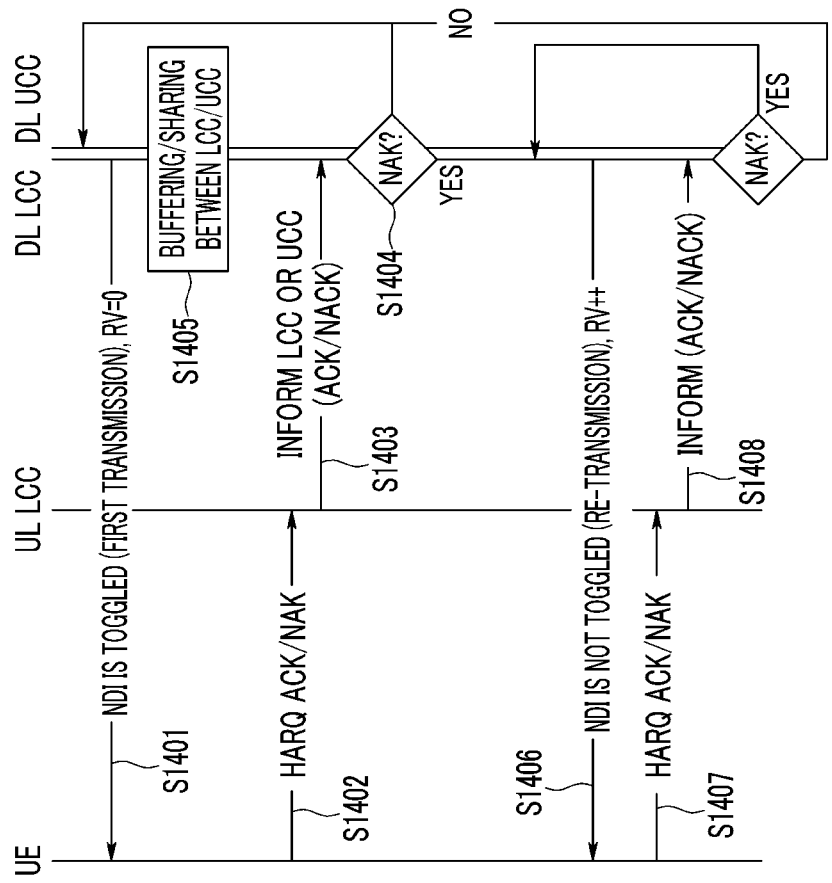
FIG. 14 is a flowchart illustrating a process of the downlink HARQ retransmission of a method 2 according to an exemplary embodiment.

FIG. 14 is a flowchart illustrating a process of the downlink HARQ retransmission of a method 2 according to an exemplary embodiment.

Referring to FIG. 14, first, the base station transmits the downlink data together with a (toggled) new data indicator (NDI) (NDI is toggled) to the terminal through the LCC or UCC (S1401). In this case, a redundancy version (RV) is 0 (RV=0). Thereafter, the terminal receiving the downlink data transmits the HARQ ACK/NACK to the base station through the LCC (S1402). In addition, the base station informs an LCC cell or an UCC cell about ACK/NACK of the terminal (S1403), and the LCC cell or the UCC cell determines whether or not the terminal transmits NACK (S1404).

If the terminal transmits ACK (i.e., does not transmit NACK), new data is again transmitted to the downlink through the LCC or UCC (S1405). However, if the terminal transmits NACK, the base station increases the redundancy version (RV++), and again transmits data corresponding to NACK without NDI (NDI is not toggled) through the LCC or UCC (S1406). Next, the terminal transmits the HARQ ACK/NACK to the base station through the LCC (S1407), and the HARQ ACK/NACK of the terminal is informed to the LCC cell or the UCC cell (S1408). That is, according to an exemplary embodiment, HARQ ACK/NACK that informs whether or not the data transmitted through the unlicensed band is successfully transmitted may be transmitted to the base station through the licensed band, and in this case, the HARQ retransmission may also be performed through the licensed band.

According to another exemplary embodiment, in the case in which carrier managements such as change/deletion/addition/activation/deactivation, etc of the carrier are required, data transmission and retransmission method according to the carrier management are provided. That is, in order to appropriately operate a mobile wireless connection system in the carrier aggregation between the unlicensed band and the licensed band, the carrier aggregation unlicensed bands, or the carrier aggregation between licensed bands, the carrier managements such as the change/deletion/addition/activation/deactivation, etc of the carrier are required.

In the case in which the carrier aggregation is performed for two or more bands, one carrier is operated as a primary component carrier, and the other carrier is operated as a secondary component carrier. For the secondary component carrier, the change/selection/deletion/addition/activation/deactivation, etc of the carrier may be performed according to an unlicensed band frequency regulation in the case in which the secondary component carrier is the unlicensed band, or according to a regulation depending on a carrier operation, a policy of a user, a setting of the base station, or the like in the case in which the secondary component carrier is not based on the unlicensed band frequency regulation. In accordance with characteristics of the carrier aggregation, the data may be transmitted and retransmitted through the carrier capable of currently transmitting the data, and a data exchange into the carrier capable of transmitting the data may be performed at a timing at which the data may be transmitted according to the carrier management. According to a carrier aggregation method of 3GPP LTE, the data retransmission (HARQ) may be performed by only the carrier in which the initial data transmission is performed.

In the case in which the carrier is deactivated (deleted/released), one or a combination of two or more of the following methods may be used.

First, there is a method for deferring (postponing) the deactivation (deletion/release) of the carrier until the data transmission is successfully completed or up to a maximum allowable time of an HARQ operation (the number of times, a time, or the like).

Alternatively, in relation to a timing (a subframe n+k1) at which the deactivation is performed at a carrier deactivation command (request) timing (a subframe n), a deactivation request timing (the subframe n), a deactivation timing (the subframe n+k1). Alternatively, there is a method in which the data transmission/retransmission may be performed only before timings corresponding to the front and the back (subframe n±k2) as much as the time which is predetermined for the deactivation request timing. After the above-mentioned timing, in the case in which the HARQ retransmission is required due to a transmission/retransmission failure of the previous data, it is regarded that the data transmission fails, the data may be newly transmitted (the retransmission is not allowed), the data retransmission may also be performed through a carrier which may be newly serviced, and in the case in which the carrier deactivated within a predetermined time is again activated to be usable for the data transmission, the data retransmission may be performed through the corresponding carrier, and the downlink control channel, or the like according to the resource allocation for the retransmission may also be operated.

According to still another exemplary embodiment, in the case in which the resource allocation is performed instead of omitting the HARQ ACK/NACK, transmission of the control channel including information of the HARQ ACK/NACK such as PHICH may be omitted. In this case, in the case in which the PHICH channel is omitted, whether or not the retransmission is performed may be distinguished by the resource allocation, but information related to PHICH (PHICH duration, or the like) including the indication for a length of PDCCH (a length of a unit of OFDM symbol) needs to be defined. That is, according to a standard of 3GPP LTE, the terminal may determine an area of PDCCH (a length of a unit of OFDM symbol) based on the PHICH duration set by the base station, but an accurate operation thereof may be required. The terminal may determine the area of PDCCH (e.g., a control format indicator (CFI)) using one or a combination of two or more of the following methods.

1. In the case in which the PHICH duration is set to an extended PHICH duration, a method for including information on the area of PDCCH in the extended PHICH duration. In this case, the information on the area of PDCCH may be a length as much as the extended PHICH duration from a first OFDM symbol within the subframe or of TTI.

2. A method for including the information on the area of PDCCH in a physical control format indicator channel (PCFICH), instead of the extended PHICH duration. In this case, the information on the area of PDCCH may be a length expressed by PCFICH from the first OFDM symbol within the subframe or of TTI (e.g., CFI if $N_{RB}^{DL}>10$ or CFI+1 if $N_{RB}^{DL} \leq 10$), or a length expressed by PCFICH from a timing at which PCFICH is transmitted (e.g., CFI if $N_{RB}^{DL}>10$ or CFI+1 if $N_{RB}^{DL} \leq 10$).

3. A method for determining OFDM symbols before a start timing of a physical downlink shared channel (PDSCH) or EPDCCH in one subframe or one TTI as the area of PDCCH.

4. A method for setting a third method (e.g., a method for including the information on the area of PDCCH in an initial signal or a reservation signal which may be included at the time of occupying/using the channel after an RRC signaling and CCA, or the like) or expressing the information on the area of PDCCH by a predefined value.

5. A method for indicating the information on the area of PDCCH in the licensed band or having the area of PDCCH having the same length as the licensed band.

According to another exemplary embodiment, when the cellular system is operated in the unlicensed band, a method for operating a channel for the data transmission will be described.

According to an unlicensed band frequency operation regulation for operating the cellular system in the unlicensed band, each device in the cellular system may determine whether or not the channel may be occupied depending on the result of CCA (i.e., in the case in which the channel is in an idle state), and may occupy the channel and transmit the data when the channel may be occupied. When the data is transmitted by the occupancy and use of the channel according to the result of CCA, interference may be reduced. However, a method for measuring interference for solving a hidden node problem, or the like of the unlicensed band is required. The reason is that it is difficult to accurately measure interference at the time of interference by the terminal, or a large amount of time is required to measure the channel. In addition, in order to provide an optimal service to the terminal, the channel measurement is required even in the case in which it is intended to select a suitable channel having good quality among several channels.

According to another exemplary embodiment, the channel may be measured by the following method. According to another exemplary embodiment, a base station transmitting zero power (ZP) channel state information-reference signal (CSI-RS) and non-zero power (NZP) CSI-RS simultaneously with the data (e.g., PDSCH transmission) is referred to as an on state UCC cell, and a base station transmitting only ZP CSI-RS or NZP CSI-RS is referred to as an off state UCC cell. That is, independent of the result of CCA (on/off state), the UCC cell may transmit at least one of ZP CSI-RS and NZP CSI-RS.

First, the terminal may measure the channel through ZP CSI-RS of the on state UCC cell and NZP CSI-RS of the off state UCC cell (on state UCC+off state UCC).

Figure 15:
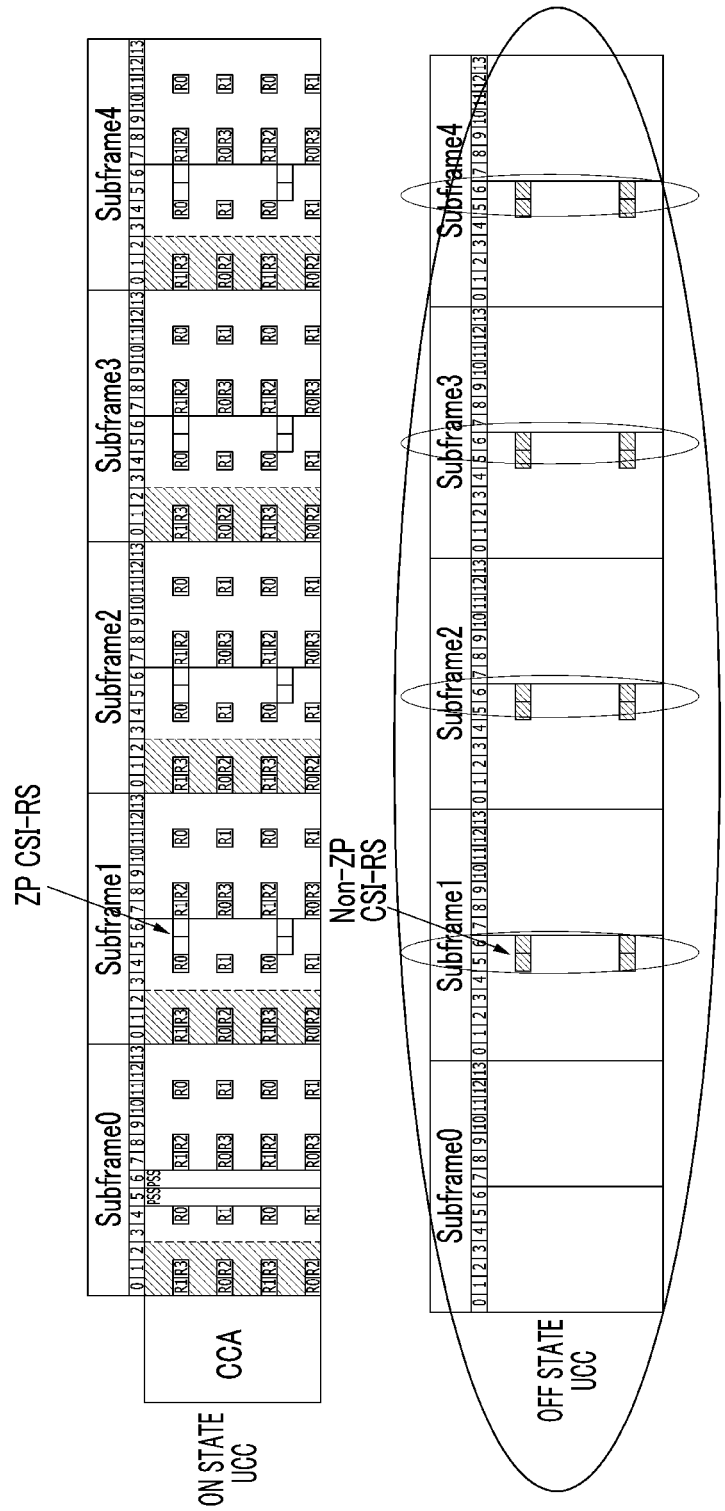
FIG. 15 is a concept view illustrating a method 1 for measuring a channel according to another exemplary embodiment.

FIG. 15 is a concept view illustrating a method 1 for measuring a channel according to another exemplary embodiment.

The on state UCC cell (i.e., performs the access/occupy of the channel through CCA to provide the data service) may perform the data transmission in the unlicensed band, but the off state UCC cell which does not occupy the channel as the result of CCA may not transmit the data. However, referring to FIG. 15, the terminal may measure the channel of the off state UCC while receiving the data through the on state UCC. To this end, the on state UCC cell (or carrier) does not transmit the data in an area in which CSI-RS is transmitted (i.e., ZP CSI-RS), and the off state UCC cell transmits NZP CSI-RS in the area of ZP CSI-RS of the on state UCC cell. Therefore, the terminal may perform the channel measurement for the off state UCC cell. In addition, ZP CSI-RS and NZP CSI-RS are set to another OFDM symbol, not an OFDM symbol in which primary synchronization signal (PSS)/secondary synchronization signal (SSS) is transmitted, in the case such as a subframe 0 including PSS/SSS.

In the case in which there are two or more off state UCC cells, the respective off state UCC cells may simultaneously transmit NZP CSI-RS, or only a predetermined off state UCC cell may transmit NZP CSI-RS at a predetermined instant. For example, one off state UCC cell predetermined for each of the subframes may be preset to transmit CSI-RS. In the case in which the two or more off state UCC cells simultaneously transmit NZP CSI-RS, the terminal may use NZP CSI-RS for an interference control by measuring interference between NZP CSI-RSs. In the case in which only one off state UCC cell transmits NZP CSI-RS at one time, the terminal may use NZP CSI-RS for a carrier selection (a technology selecting a carrier serviceable or capable of providing an optimal service among a plurality of carriers), or use NZP CSI-RS to detect a device (e.g., a priority user or radar) which should be prioritized in the unlicensed band. In the case in which there is only one off state UCC cell, the terminal may measure both interference and channel quality through NZP CSI-RS, and may also use the NZP CSI-RS for the interference control or the carrier selection. Alternatively, the terminal may measure a channel of another cell in an area corresponding to ZP CSI-RS (or CSI-IM) using ZP CSI-RS of the on state UCC cell.

Figure 16:
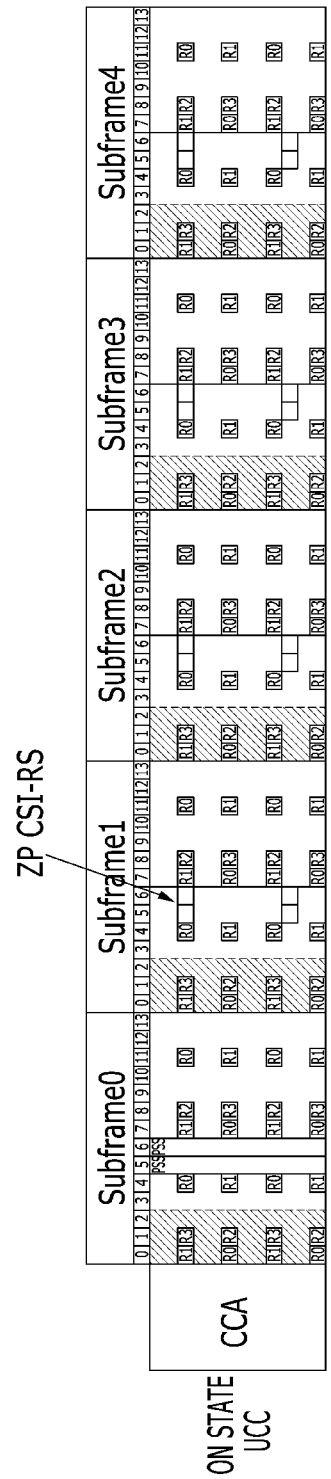
FIG. 16 is a concept view illustrating a method 2 for measuring a channel according to another exemplary embodiment.

FIG. 16 is a concept view illustrating a method 2 for measuring a channel according to another exemplary embodiment.

Referring to FIG. 16, the on state UCC cell (the cell accessing/occupying the channel through CCA to provide the data service) performs the data transmission in the unlicensed band, but only the on state UCC cell transmits ZP CSI-RS to a transmission area of CSI-RS without cooperation between UCC cells. The terminal may measure an interference degree of channel based on the data transmitted from an unlicensed band device such as a neighboring UCC cell, WiFi, or the like in the transmission area of CSI-RS. In addition, the terminal may also detect the device (e.g., the priority user or radar) which should be prioritized in the unlicensed band.

Alternatively, the terminal may perform the channel measurement using DRS (or DS) defined in (3GPP) Rel-12 small cell.

Figure 17:
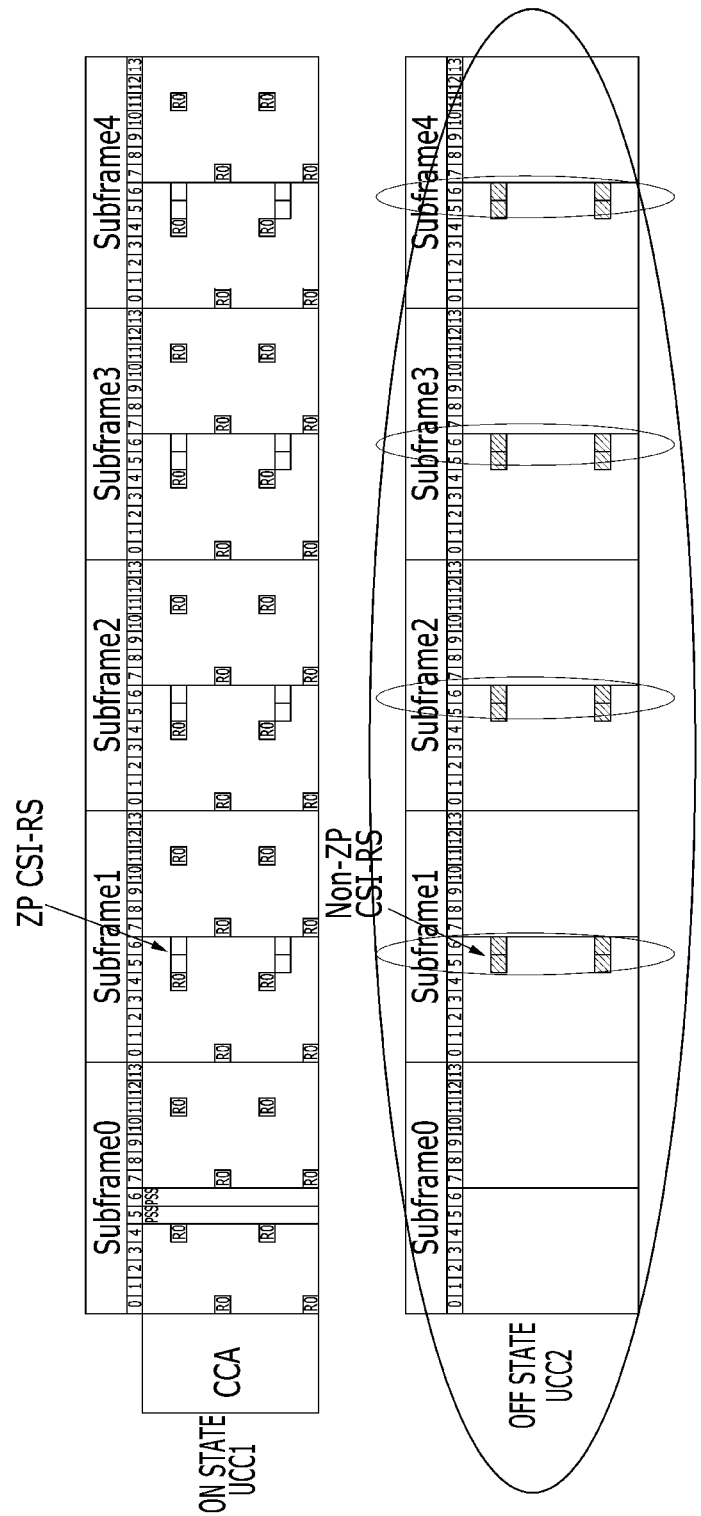
FIG. 17 is a concept view illustrating a method 3 for measuring a channel according to another exemplary embodiment.

FIG. 17 is a concept view illustrating a method 3 for measuring a channel according to another exemplary embodiment.

In FIG. 17, a small cell that occupies the channel as the result of CCA transmits DRS, and a small cell that does not occupy the channel as the result of CCA does not transmit DRS. Referring to FIG. 17, a cell (i.e., UCC1) transmitting DRS among the UCC cells transmits a DRS signal, and transmits ZP CSI-RS in a CSI-RS transmission area. In addition, a cell (i.e., UCC2) that does not transmit DRS transmits NZP CSI-RS in the CSI-RS transmission area of UCC1. In addition, even in the case in which the UCC cell is in an on state, DRS is transmitted, thereby making it possible to support the method for measuring the channel. The terminal receiving DSR transmitted from the base station may measure interference (e.g., an UCC cell which does not cooperate with the UCC1, a WiFi signal, or the like) by another cell (e.g., UCC2), instead of measuring the channel of the UCC1 in the CSI-RS transmission area. Alternatively, by transmitting a signal by which the respective cells are classified for each of the cooperating cells, the terminal may select the carrier, or detect the device which should be prioritized in the unlicensed band. For example, a specific UCC cell may design the signal so that the signal is transmitted only in a specific subframe or the respective cells may be classified even though the signal is transmitted in the same section. Meanwhile, in the case of the subframe in which PSS/SSS is included in DRS at the time of transmitting DRS, the CSI-RS transmission area may be set to be positioned while avoiding the OFDM symbol in which PSS/SSS is transmitted.

According to another exemplary embodiment, a method for setting a resource for a channel measurement/report will be described.

A channel state measurement in 3GPP LTE is controlled by the base station. The channel state measurement includes a measurement/report for a wideband of a system, and a measurement/report for a subband of the system band. In addition, depending on a report period, the report may be classified into a periodic report/aperiodic report. The resource for the channel state measurement includes channel state information-interference measurement (CSI-IM).

The cellular system (licensed assisted access (LAA)) in the unlicensed band may hold the channel, reserve the channel, and use the channel through WiFi or competition with another cellular system operated in the other unlicensed band. Since the channel is used through the competition, while a serving base station transmits the data, Wi-Fi or another LAA does not transmit the data, or the serving base station does not transmit the data, and Wi-Fi or another LAA transmits the data. Therefore, a method for efficiently measuring interference for the unlicensed band is required.

Since the channel state measurement is performed in a service band with the base station, and the data may be continuously transmitted on characteristics of the licensed band, the terminal may perform the channel state measurement through CSI-RS/CSI-IM in a preset section. However, since the channel access/use is performed through the competition in the unlicensed band, the transmission of CSI-RS/CSI-IM may not be guaranteed, and while the base station transmits the data to the terminal, interference for another device (Wi-Fi or another LAA) may be inaccurately measured. According to another exemplary embodiment, the channel state measurement in the unlicensed band may be performed by one or a combination of two or more of the following methods.

1. A Channel State Measurement Through Cell Specific RS (CRS)

This is a method which may be generally used even in the unlicensed band, and may be utilized for a case in which CSI-RS is not set, a case of a transmission mode (TM)1 to TM8 supported by 3GPP LTE, a case of a TM9 in which a precoding matrix indicator-rank indicator-report (PMI-RI-Report) is not set, and the like.

2. A Channel State Measurement Through (NZP) CSI-RS

This method may set a CSI-RS resource configuration, and may be utilized for the TM9 in which PMI-RI-Report is set, the TM10, and the like.

3. A Channel State Measurement Through ZP CSI-RS

The terminal measures interference in an area in which ZP CSI-RS is set (e.g., set through ZP CSI-RS resource configuration, csi-SubframePatternConfig)

4. A Channel State Measurement Through CSI-IM

This is an area measuring interference supported by 3GPP LTE TM10, or the like, which may be set through a CSI-IM resource configuration, and the terminal measures interference in the set area.

5. A Channel State Measurement Through an Interference Resource (e.g., a Resource for RSSI Measurement, or the Like)

The terminal may define a resource for measuring interference (RSSI) for another device in the unlicensed band, and may perform the channel state measurement by setting/using the resource for RSSI measurement.

According to an exemplary embodiment, CSI-RS may be set as follows.

CSI-RS may be set by the CSI-RS resource configuration, and may include information defined by 7.2.5 of TS36.213. Meanwhile, depending on the unlicensed band frequency regulation, in order to operate the cellular system in the unlicensed band, CCA is performed for the access/occupy/use of the channel, and the occupied channel should not exceed the maximum channel occupancy time (COT). In addition, since it is difficult for the reservation/use of the channel to guarantee an LTE subframe boundary, there may be transmission time interval (TTI) which is smaller than 1 ms or is greater than 1 ms. In addition, continuity of the reservation/use of the channel is not guaranteed. Therefore, in order to operate a cellular in the unlicensed band, the following contents may be included in the CSI-RS configuration. The following contents may be applied to the method for setting CSI-IM in the same/similar way.

A coordination of the CSI-RS configuration is as follows.

For each of FDD/TDD frame types, in the case of FDD, there are configurations of 0 to 19, and in the case of TDD, there are configurations of 0 to 31. However, since a new frame type may be defined in the unlicensed band independent of FDD/TDD, the CSI-RS configuration may be set by the following four methods.

A method 1 for setting a CSI-RS configuration: a frame type having the same type as the frame type of PCell is assumed, and the CSI-RS configuration is set.

A method 2 for setting a CSI-RS configuration: a frame type of the unlicensed band is set, and the CSI-RS configuration is set according to the set frame type.

A method 3 for setting a CSI-RS configuration: the CRI-RS configuration is set without setting the frame type of the unlicensed band.

A method 4 for setting a CSI-RS configuration: the CRI-RS configuration is set by adding a new CSI-RS configuration as illustrated in the following Table 1.

TABLE 1

| CSI-RS Configuration | Number of CSI-RS configurations (Number of CSI-RS configured) | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| k | 9 and 2 | 0 | 9 and 2 | 0 | 9 and 2 | 0 |
| k + 1 | 8 and 2 | 0 | 8 and 2 | 0 | | |
| k + 2 | 3 and 2 | 0 | | | | |
| k + 3 | 2 and 2 | 0 | | | | |

A coordination of the CSI-RS subframe configuration ($I_{CSI-RS}$) is as follows.

In the case in which Equation 4 is satisfied according to $I_{CSI-RS}$, CSI-RS is included in the corresponding subframe.

$$(10n_f + \lfloor n_s/2 \rfloor - \Delta_{CSI-RS}) \% \, T_{CSI-RS} = 0 \quad \text{[Equation 4]}$$

In Equation 4, of is a system frame number, $n_s$ is a slot number within a radio frame, $\Delta_{CSI-RS}$ is a subframe offset (a unit of subframe) of CSI-RS, and $T_{CSI-RS}$ is a CSI-RS periodicity (a unit of subframe, i.e., 5, 10, 20, 40, or 80 ms).

In order for the terminal to measure the channel state through CSI-RS, CSI-RS should be transmitted while the channel is occupied/used. However, in the case in which the maximum channel occupancy time (COT) is smaller than a minimum transmission periodicity (i.e., 5 ms) of CSI-RS, the subframe including CSI-RS may not exist within the channel occupancy time. According to an exemplary embodiment, in order to allow the subframe including CSI-RS to exist within the channel occupancy time, the setting of CSI-RS is adjusted. According to an exemplary embodiment, CSI-RS is set according to the following conditions, and CSI-RS may be set by a method for combining two or more conditions.

condition 1: $T'_{CSI-RS} \leq \min(T_{CSI-RS}, \max COT)$ condition 2: $T'_{CSI-RS} = \max COT$ condition 3: CSI-RS is included every k-th subframe within COT (k=1, 2, ..., maxCOT).

condition 3-1: set a length of COT (the number of subframes) within COT in a bitmap type, to include CSI-RS in the subframe in which a bitmap is set, or set the bitmap for the number of slots within COT.

condition 4: reuse existing $I_{CSI-RS}/T_{CSI-RS}$, and include CSI-RS only in the case in which a timing in which CSI-RS is included and a timing of the occupancy/use of the channel are overlapped with each other.

condition 5: allow the terminal to recognize information of a resource element (RE) in which CSI-RS is included among the subframes by indicating whether or not CSI-RS is transmitted for every the subframe, or indicating that CSI-RS is included only in the subframe in which CSI-RS is included, and setting the CSI-RS resource configuration (particularly, CSI-RS configuration).

A limit of the subframe in which CSI-RS is transmitted is as follows.

On characteristics of CCA, the data transmission may not occur to be matched to a start/end timing of the subframe. Particularly, a first TTI and the last TTI within COT may start/end in the middle of the subframe. In this case, a setting for CSI-RS may be required for the data transmission section within COT. According to an exemplary embodiment, whether or not CSI-RS is included in the data transmission section within COT (inclusion or no inclusion) may be set (include, not include, etc.) by the following methods.

A method 1 for transmitting CSI-RS: CSI-RS is limited so as not to be transmitted in the first/last TTI within COT.

A method 2 for transmitting CSI-RS: the transmission of CSI-RS is limited in the case in which the first/last TTI is a partial subframe (in this case, the first TTI may be a partial starting subframe, and the last TTI may be a partial ending subframe). That is, even in the case in which the OFDM symbol in which CSI-RS may be included according to the setting of CSI-RS is included, CSI-RS is limited so as not to be included in the partial subframe, and the terminal does not perform an operation for the channel measurement.

A method 3 for transmitting CSI-RS: even though the first/last TTI is the partial starting subframe or the partial ending subframe, if the OFDM symbol in which CSI-RS may be transmitted is included, CSI-RS is transmitted.

A method 4 for transmitting CSI-RS: in the case in which the first/last TTI is the partial starting subframe or the partial ending subframe, if the first/last TTI is a specific length (i.e., the number of OFDM symbols included in TTI) or less, the transmission of CSI-RS is limited even in the case in which it is set that CSI-RS is included according to the setting of CSI-RS. However, if the first/last TTI is the specific length or more, CSI-RS is transmitted (included) in the case in which it is set that CSI-RS is included.

In the case in which it is set so that CSI-RS is included in the OFDM symbol overlapped with CRS, the limit may be made as follows.

Method 1: limit so as not to include CRS and set so as to include CSI-RS.

Method 2: limit (not set) so as not include CSI-RS, and set so as to include (transmit) CRS.

The limit may be made as follows in the OFDM symbol overlapped with PSS/SSS.

Method 1: limit so as not to include PSS/SSS and set so as to include CSI-RS.

Method 2: limit (not set) so as not include CSI-RS, and set so as to include (transmit) PSS/SSS.

Method 3: in the case in which it is set that CSI-RS is included in the OFDM symbol including PSS/SSS, set that CSI-RS is included only in the remaining resources (subcarriers) except for the resource for PSS/SSS transmission.

According to an exemplary embodiment, ZP CSI-RS may be set as follows.

Depending on the unlicensed band frequency regulation, in order to operate the LAA in the unlicensed band, CCA is performed for the access/occupy/use of the channel, and the channel occupancy through CCA should not exceed the maximum channel occupancy time (COT). In this case, since it is difficult to occupy/use the channel according to an LTE subframe boundary, there may be TTI which is smaller than 1 ms or is greater than 1 ms. In addition, continuity of the reservation/use of the channel may not be guaranteed. Therefore, in order to operate a cellular in the unlicensed band, the zeroTxPowerResourceConfigList may be included in the ZP CSI-RS resource configuration.

The zeroTxPowerResourceConfigList is configured by the bitmap of 16 bits and is generally applied in the case in which the number of antenna ports are four, but may be set as follows in order to provide ZP CSI-RS of various types, similar to the setting of NZP CSI-RS.

Method 1: a method for assuming a frame of the unlicensed band as the same frame type as the frame type of PCell, and setting zeroTxPowerResourceConFIGList.

In this case, i) an existing zeroTxPowerResourceConfigList may be reused, or ii) the number of antenna ports (# of antenna port) may be included in zeroTxPowerResourceConFIGList.

Method 2: a method for setting the frame type of the unlicensed band, and setting zeroTxPowerResourceConFIGList accordingly.

In this case, i) the existing zeroTxPowerResourceConfigList may be reused intactly, or ii) the number of antenna ports may be included in zeroTxPowerResourceConFIGList.

Method 3: a method for not setting the frame type of the unlicensed band, and setting zeroTxPowerResourceConFIGList.

In this case, i) the existing zeroTxPowerResourceConfigList may be reused intactly, or ii) the number of antenna ports may be included in zeroTxPowerResourceConFIGList.

Method 4: a method for allowing ZP CSI-RS to be set by adding new zeroTxPowerResourceConfigList as illustrated in the following Table 2.

TABLE 2

| CSI reference signal configuration | Number of CSI reference signals configured | | | | | |
|---|---|---|---|---|---|---|
| | 1 or 2 (k', l') | $n_s$ mod 2 | 4 (k', l') | $n_s$ mod 2 | 8 (k', l') | $n_s$ mod 2 |
| k | 9 and 2 | 0 | 9 and 2 | 0 | 9 and 2 | 0 |
| k + 1 | 8 and 2 | 0 | 8 and 2 | 0 | | |
| k + 2 | 3 and 2 | 0 | | | | |
| k + 3 | 2 and 2 | 0 | | | | | zeroTxPowerSubframeConfig($I_{CSI-RS}$) is as follows.

In the case in which Equation 5 is satisfied according to $I_{CSI-RS}$, ZP CSI-RS may be included in the corresponding subframe.

$$(10n_f \lfloor n_s/2 \rfloor - \Delta_{CSI-RS}) \% T_{CSI-RS} = 0 \quad \text{[Equation 5]}$$

In Equation 5, of is a system frame number, $n_s$ is a slot number within a radio frame, $\Delta_{CSI-RS}$ is a subframe offset (a unit of subframe) of CSI-RS, and $T_{CSI-RS}$ is a CSI-RS periodicity (a unit of subframe, i.e., 5, 10, 20, 40, or 80 ms).

Meanwhile, in order for the terminal to measure the channel state through CSI-RS, CSI-RS should be transmitted while the channel is occupied/used. However, in the case in which the maximum channel occupancy time (COT) is smaller than a minimum transmission periodicity (i.e., 5 ms) of ZP CSI-RS, the subframe including ZP CSI-RS may not exist within the channel occupancy time. According to an exemplary embodiment, in order to allow the subframe including ZP CSI-RS to exist within the channel occupancy time, the setting of ZP CSI-RS is adjusted. According to an exemplary embodiment, ZP CSI-RS is set according to the following conditions, and ZP CSI-RS may be set by a method for combining two or more methods.

Method 1: $T'_{CSI-RS} \leq \min(T_{CSI-RS}, \max COT)$

Method 2: $T'_{CSI-RS} = \max COT$

Figure 18:
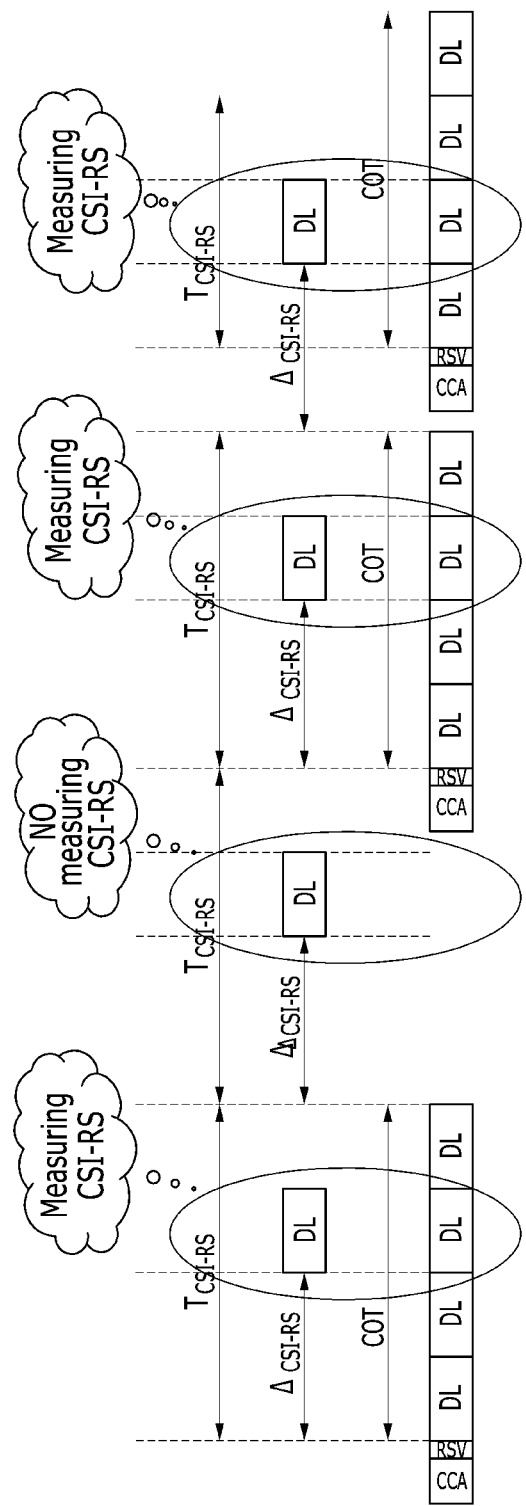
FIG. 18 is a concept view illustrating a method for setting CSI-RS according to an exemplary embodiment.

FIG. 18 is a concept view illustrating a method for setting CSI-RS according to an exemplary embodiment.

Referring to FIG. 18, in the case of the method 1 and the method 2, the terminal may measure CSI-RS transmitted in COT and report a measurement result by adjusting $T_{CSI-RS}$ to a value which is smaller than COT or the same value as COT.

Figure 19:
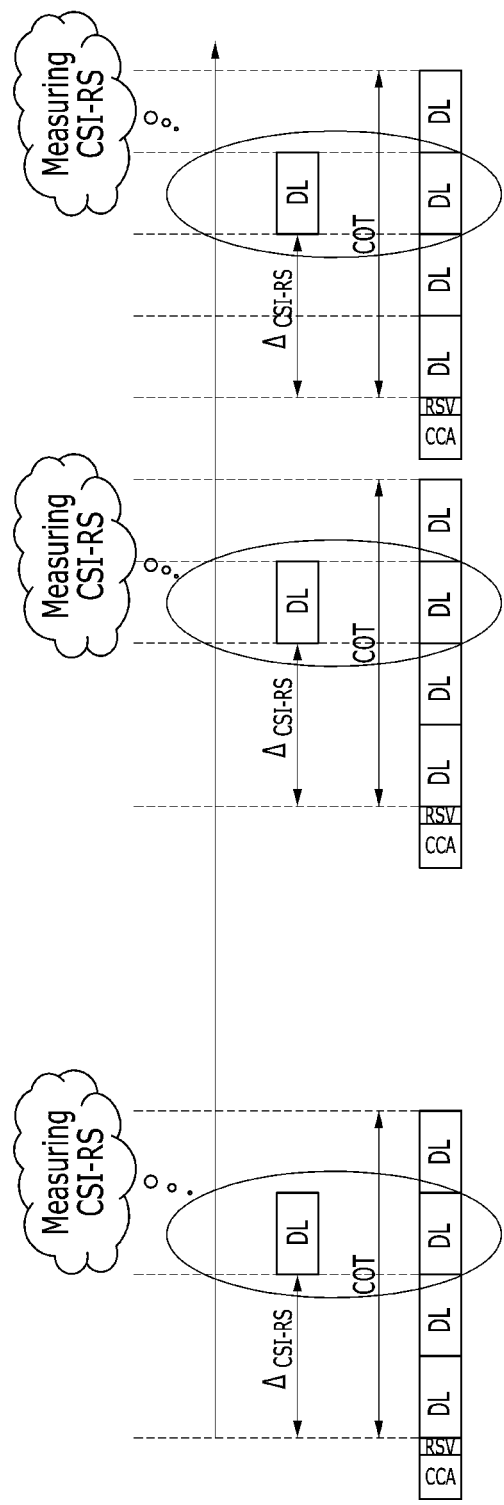
FIG. 19 is a concept view illustrating a method for setting CSI-RS according to another exemplary embodiment.

FIG. 19 is a concept view illustrating a method for setting CSI-RS according to another exemplary embodiment.

Method 3: a method for transmitting CSI-RS in every k-th subframe within COT (k=1, 2, . . . , maxCOT). In this case, the terminal may measure CSI-RS and report the measurement result.

Method 3-1: a method for setting a length of COT (the number of subframes) in a bitmap type, and transmitting CSI-RS in the subframe indicated in a bitmap.

Method 4: a method for indicating whether or not CSI-RS is transmitted to the terminal every the subframes or indicating whether or not CSI-RS is transmitted to the terminal only in the subframe in which the CSI-RS is included. In this case, the terminal may recognize information of a resource element (RE) in which CSI-RS is included within the subframe through a resource configuration of CSI-RS (particularly, CSI-RS configuration).

Meanwhile, the bitmap may also indicate the number of slots within COT. Referring to FIG. 19, the bitmap may also indicate that CSI-RS is transmitted in a third subframe, such as 0010.

Figure 20:
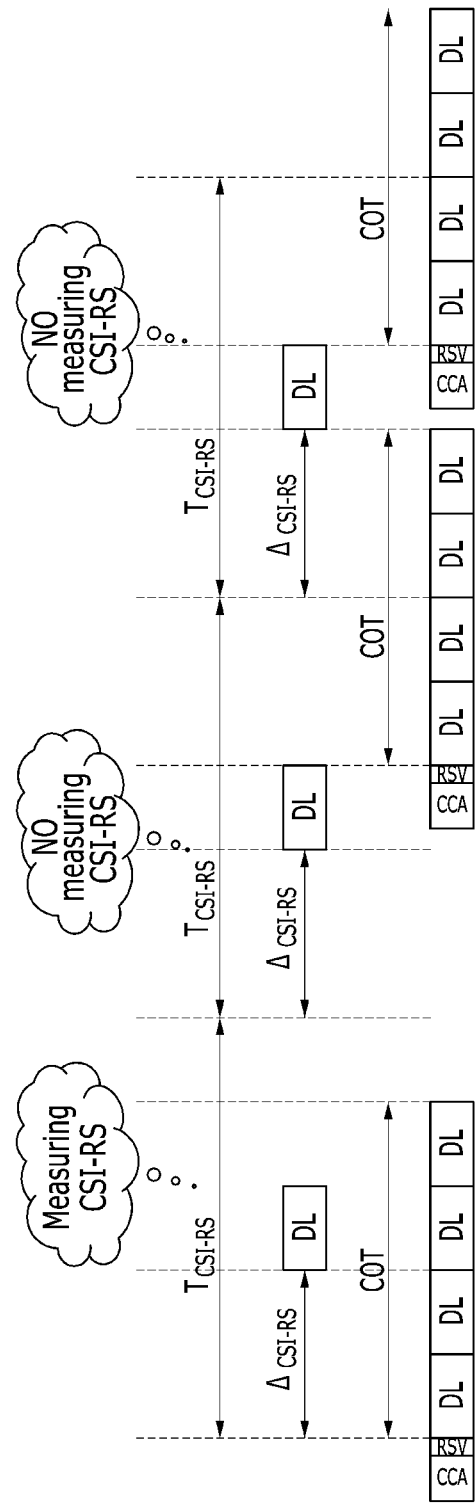
FIG. 20 is a concept view illustrating a method for setting CSI-RS according to still another exemplary embodiment.

FIG. 20 is a concept view illustrating a method for setting CSI-RS according to still another exemplary embodiment.

Method 4: a method for reusing existing $I_{CSI-RS}$ and $T_{CSI-RS}$. That is, referring to FIG. 20, the terminal assumes that COT and $T_{CSI-RS}$ are partially overlapped with each other, measures the channel only through CSI-RS transmitted during COT, and reports the measurement result.

Method 5: a method for reusing existing $I_{CSI-RS}/T_{CSI-RS}$. In this case, the terminal assumes that ZP CSI-RS is included at a timing at which ZP CSI-RS is positioned independent of the occupancy/use of the channel, and performs the channel measurement.

Method 6: a method for reusing existing $I_{CSI-RS}/T_{CSI-RS}$. In this case, if the channel is not occupied/used at the timing at which ZP CSI-RS is positioned, the terminal performs the channel measurement.

Method 7: a method in which the ZP CSI-RS configuration is performed as RRC, and the like (e.g., one or a combination of two or more of sequence, DCI in PDCCH, PCFICH, and PHICH). In this case, whether or not ZP CSI-RS is included every the subframes may be indicated to the terminal.

Method 8: a method for not setting ZP CSI-RS and including a ZP CSI-RS configuration through DCI.

Meanwhile, a CSI-RS transmission subframe may be limited. On characteristics of CCA, the data may not be transmitted to be matched to a start/end timing of the subframe. Particularly, in the case in which the first TTI and the last TTI within COT start/end in the middle of the subframe, the setting for ZP CSI-RS may be required for the data transmission section within COT. According to an exemplary embodiment, whether or not ZP CSI-RS is included in the data transmission section within COT (inclusion or no inclusion) may be set by the following methods. In this case, one method of the following methods may be selectively applied, or two or more methods may be combined.

Method 1: limit so as not to transmit (include) ZP CSI-RS in the first/last TTI.

Method 2: in the case in which the first/last TTI is a partial subframe, limit the transmission of ZP CSI-RS (i.e., not include). That is, ZP CSI-RS is limited so as not to be included in the OFDM symbol in which ZP CSI-RS may be included according to the setting of CSI-RS, and the terminal does not perform an operation for the channel measurement.

A method 3: even though the first/last TTI is the partial subframe, if the OFDM symbol in which CSI-RS may be included is included according to the setting of CSI-RS, ZP CSI-RS is included.

Meanwhile, in the case in which it is set so that CSI-RS is included in the OFDM symbol overlapped with CRS, the limit may be made as follows.

Method 1: limit so as not include CRS in the OFDM symbol overlapped with CRS and include (transmit) CSI-RS.

Method 2: limit so as not to include ZP CSI-RS in the OFDM symbol overlapped with CRS and include (transmit) CRS.

In addition, in the case in which it is set so that CSI-RS is included in the OFDM symbol overlapped with PSS/SSS, the limit may be made as follows.

Method 1: limit so as not to include PSS/SSS in the OFDM symbol overlapped with PSS/SSS and include (transmit) CSI-RS.

Method 2: limit so as not to include CSI-RS in the OFDM symbol overlapped with PSS/SSS and include (transmit) PSS/SSS.

Method 3: in the case in which it is set that CSI-RS is included in the OFDM symbol including PSS/SSS, limit so as to include CSI-RS only in the remaining resources (subcarriers) except for the resource for PSS/SSS transmission.

Next, a method for measuring a channel through RSSI will be described in detail. According to an exemplary embodiment, RSSI may be used for a method for measuring a channel state of a serving base station using CRS. Particularly, RSSI may be used to measure interference, and may be set/measured by the following methods. In this case, one method of the following methods may be selectively applied, or two or more methods may be combined.

Method 1: a method for measuring RSSI using NZP CSI-RS. The terminal measures the channel state in the transmission area set so as to include NZP CSI-RS.

Method 2: a method for measuring RSSI using ZP CSI-RS (or CSI-IM). The terminal measures the channel state in the transmission area set so as to include ZP CSI-RS.

Method 3: a method for measuring a channel state in an area/section that does not occupy the channel (non-COT).

Method 4: a method for measuring a channel state in an OFDM symbol in which CRS is not included within COT occupying the channel.

Method 5: a method for measuring a channel state in an OFDM symbol in which CSI-RS/CRS is not included within COT occupying the channel.

Meanwhile, the terminal may measure interference by performing the RSSI measurement in the entirety of the subcarriers of the system band, instead of measuring RSSI using CSI-RS/CRS in order to measure interference. In this case, one method of the following methods may be selectively applied, or two or more methods may be combined.

in the case in which the channel state is measured within COT or the channel state is measured in a non-occupied area (non-COT), if the section (time) set by the RSSI measurement and the section in which the channel is occupied are overlapped with each other due to a non-continuous channel occupancy, the terminal may be set so as not to perform the channel measurement. That is, the terminal may be set so as to perform the channel measurement only in the section in which the set section and the occupied channel are not overlapped with each other. The terminal may measure the channel state during a specific section (the subframe, a slot, or the OFDM symbol) from the corresponding subframe, according to the following Equation 6.

$$(10n_f + \lfloor n_s/2 \rfloor - \Delta_{RSSI})\% \ T_{RSSI} = 0 \qquad \text{[Equation 6]}$$

In Equation 6, of is a system frame number, $n_s$ is a slot number within a radio frame, $\Delta_{RSSI}$ is a subframe offset (a unit of subframe), and $T_{RSSI}$ is a periodicity of RSSI (a unit of subframe).

The terminal may be set to measure the channel state during a specific section (the subframe, the slot, or the OFDM symbol) indicated (or preset) by a k-th subframe (or slot) before/after COT.

The terminal may be set to measure RSSI in the corresponding subframe in the case in which the base station does not occupy the channel as the result of CCA, based on information on the section in which CCA is performed, received from the base station.

in the case in which the channel is already occupied/used by the base station in the section in which RSSI needs to be measured, the base station may cancel (end the use) the occupied channel before a predetermined time (≥0) from the measurement section of the terminal, and the terminal may measure RSSI of the channel from which the occupancy of the base station is canceled. Alternatively, in the case in which the terminal recognizes that the channel is occupied/used by the base station (recognize based on the indication of the base station or a data reception of the terminal), the terminal may postpone the RSSI measurement until a channel cancellation (a use end) of the serving base station is recognized, or defer the measurement up to a next RSSI measurement period, and may again measure RSSI when the RSSI measurement is possible later. Alternatively, in the case in which the serving base station occupies/uses the channel in the RSSI measurement period, the base station may be set so that the terminal does not measure RSSI of the corresponding channel.

if the base station does not occupy the channel at a timing at which the data transmission is expected after a predetermined period from a DRS transmission or an uplink resource allocation, the base station may be set so that the terminal measures RSSI.

Figure 21:
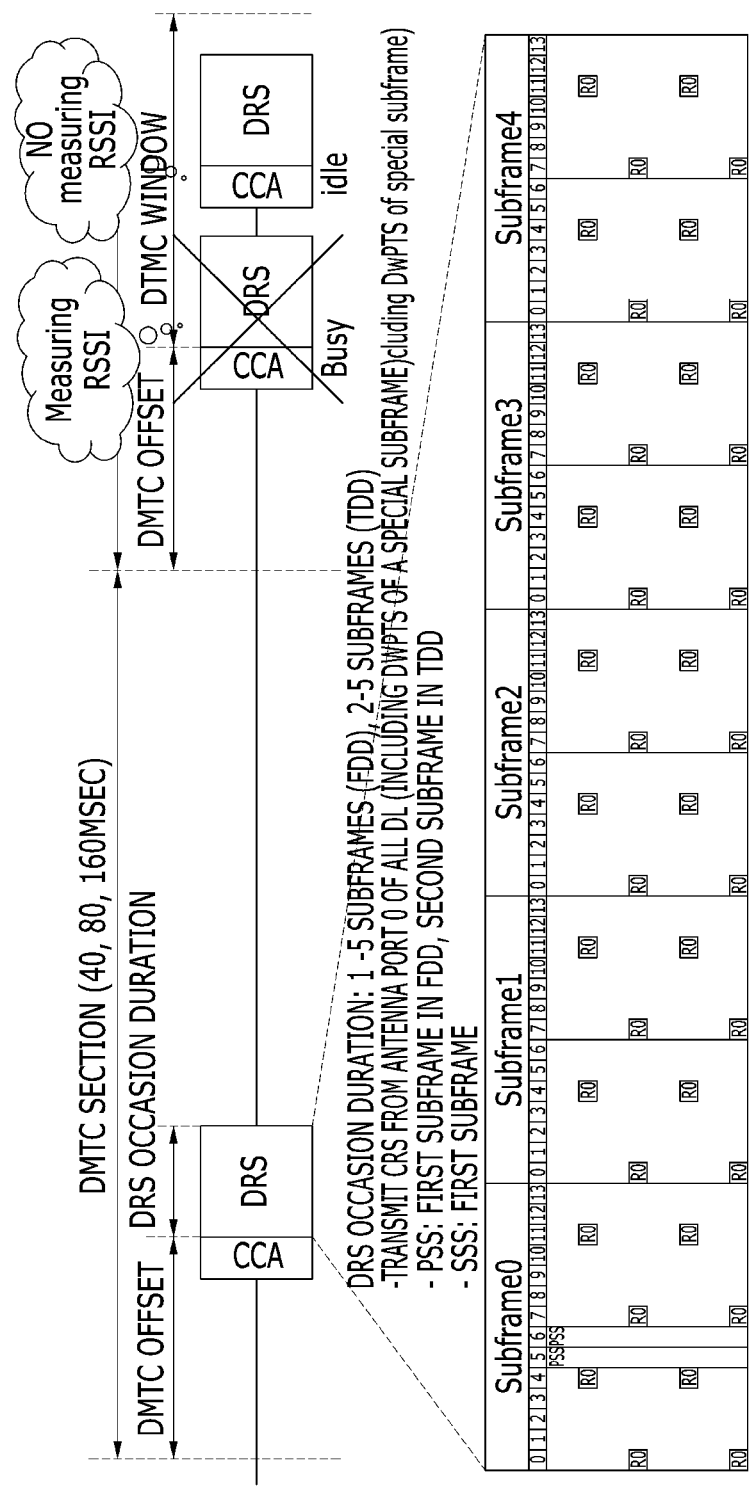
FIG. 21 is a concept view illustrating a method for measuring a channel state of a terminal according to an exemplary embodiment.
Figure 22:
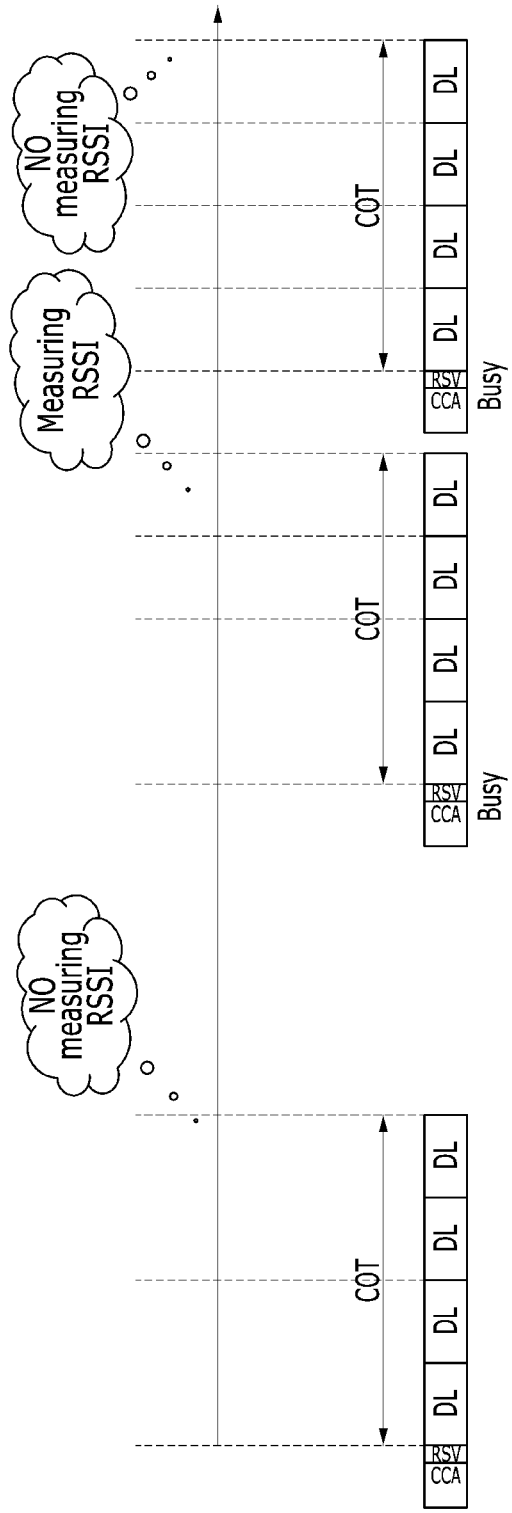
FIG. 22 is a concept view illustrating a method for measuring a channel state of a terminal according to another exemplary embodiment.

FIG. 21 is a concept view illustrating a method for measuring a channel state of a terminal according to an exemplary embodiment and FIG. 22 is a concept view illustrating a method for measuring a channel state of a terminal according to another exemplary embodiment. Referring to FIG. 21, if the base station does not occupy the channel and DRS is not transmitted, the terminal may measure RSSI in the section in which DRS is not transmitted. Referring to FIG. 22, in the case in which the data transmitted from the base station is not received due to a channel occupancy fail, or in the case in which the terminal does not transmit uplink data to be transmitted to the base station due to the channel occupancy fail (e.g., a timing of n+k), the terminal may measure RSSI. In this case, the base station may inform the terminal about a fact that the base station attempts to occupy the channel or a fact of the channel occupancy failure, through the licensed band. In the case of the uplink data transmission, since the terminal already knows a timing (n+k) at which the data transmission is expected, from a timing n at which an uplink resource is allocated, the terminal may measure RSSI when the channel is not occupied at the timing (n+k).

Next, a method for measuring and reporting a channel within COT will be described in detail. As described above, in the case in which only the partial subframe (some OFDM symbols of the entirety of TTI) is used due to the limit of the channel occupancy time, the terminal may measure the channel state by the following method. In this case, one method of the following methods may be selectively applied, or two or more methods may be combined.

Method 1: a method for performing, by the terminal, a measurement only in the case in which COT is used as a downlink frame.

Method 2: a method for performing, by the terminal, a measurement only in the case in which the partial subframe is a predetermined length or more. In this case, in the case in which the partial subframe is the predetermined length or less, it may be assumed (limited) that CSI-RS, PSS/SSS, and the like for the channel measurement are not included.

Method 3: a method for measuring, by the terminal, a measurement only in the case in which the partial subframe includes RS for the channel measurement such as CRS, CSI-RS, and the like.

In addition, in this case, the terminal may report the measured channel state to the base station by the following methods. In this case, one method of the following methods may be selectively applied, or two or more methods may be combined.

Method 1: a method for reporting the measured channel state using the uplink control channel of the licensed band (e.g., PUCCH).

Method 2: a method for reporting the measured channel state using the uplink control channel of the unlicensed band (e.g., PUCCH).

Method 3: a method for reporting the measured channel state by including the measured channel state in the data at the time of transmitting the uplink data of the licensed band (e.g., PUSCH).

Method 4: a method for reporting the measured channel state by including the measured channel state in the data at the time of transmitting the uplink data of the unlicensed band (e.g., PUSCH).

In addition, a report timing of the measured channel state may be set by the following methods. In this case, one method of the following methods may be selectively applied, or two or more methods may be combined.

Method 1: A Periodic Report

Figure 23:
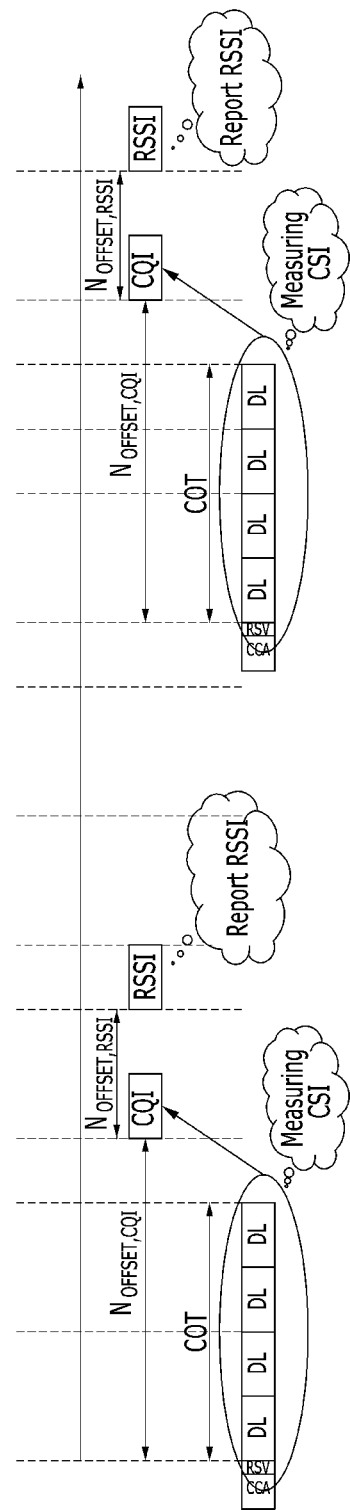
FIG. 23 is a concept view illustrating a method for reporting a channel state according to an exemplary embodiment.

In this case, the report of the measured channel state may be performed through the uplink control channel (e.g., PUCCH), and the report may be performed at a timing n+k (a first uplink subframe, which is k≥4). FIG. 23 is a concept view illustrating a method for reporting a channel state according to an exemplary embodiment. Referring to FIG. 23, since the channel state may be measured in the case in which the channel is occupied, the measurement result may be reported at an n+k-th subframe in relation to an occupancy timing n of the channel by taking account of a discontinuous channel occupancy. The measurement result of the channel state may be reported during a predetermined time or a predetermined number of times. In addition, a measurement result after the predetermined time, except for the measurement result of the same contents or a measurement result before the predetermined time in relation to the measurement report timing, may be reported.

Method 2: A Non-Periodic Report

In this case, the report of the measurement result may be performed by a request of the base station (e.g., through PUSCH), by a predetermined setting, or through the uplink control channel (e.g., PUCCH). The report may be performed at an n+k-th uplink subframe timing in relation to the timing n at which the request of the base station is received. In addition, the measurement result before the predetermined time in relation to the measurement report timing may be set so as not to be included in the n+k subframe timing, and after the measurement result is again calculated as needed, the calculated measurement result may be reported. In the case in which the base station allocates (the timing n) the uplink resource for the report, but the channel is not occupied between the subframe n to the subframe n+k, in the case in which the channel is occupied, but the resources (e.g., CSI-RS/CSI-IM, etc) for the channel measurement are not transmitted during the corresponding section, or in the case in which the terminal does not carry the measurement result in the uplink subframe at the n+k subframe timing (i.e., in the case in which only general data is transmitted), the terminal may inform the base station about the above-mentioned cases, or may not transmit the data. In this case, the fact informed to the base station by the terminal may include a previously measured channel state (a relatively old channel measurement value for the occupied channel). When the terminal transmits the uplink subframe at the n+k subframe timing, in the case in which data for reporting the measurement result of the channel state is additionally allocated, the terminal may transmit only the general data or may include the above-mentioned fact (e.g., not measured) to be added to the general data. In this case, the fact includes a previously measured channel state (a relatively old channel measurement value for the occupied channel). Since the channel is discontinuously occupied and the channel state may be measured only in the case in which the channel is occupied, the measurement result may be reported through the n+k subframe (e.g., the first uplink subframe, which is k≥4) in relation to the occupancy timing n.

In the case in which the method 1 and method 2 about the measurement result report of the channel state are combined, or are combined with measurement result reports for other channels (e.g., a primary component carrier channel measurement report, another subcarrier channel measurement report), another channel measurement may be prioritized and the measurement result report for the corresponding channel may be omitted. Particularly, if the measurement report for another channel needs to be simultaneously performed in the case in which the channel measurement is not performed, another channel measurement is prioritized, thereby making it possible to omit the measurement result report for the corresponding channel.

Figure 24:
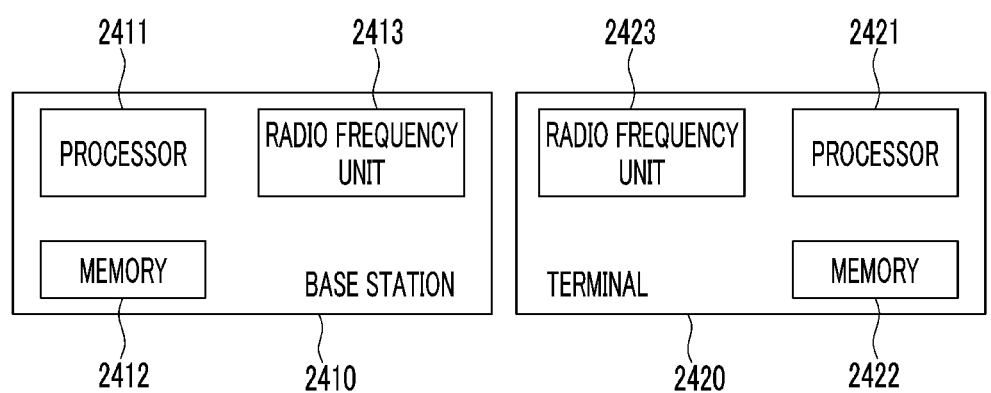
FIG. 24 is a block diagram illustrating a wireless communication system according to an exemplary embodiment.

FIG. 24 is a block diagram illustrating a wireless communication system according to an exemplary embodiment.

Referring to FIG. 24, a wireless communication system according to an exemplary embodiment includes a base station 2410 and a terminal 2420.

The base station 2410 includes a processor 2411, a memory 2412, and a radio frequency (RF) unit (2413). The memory 2412 may be connected to the processor 2411 and may store a variety of information for driving the processor 2411 or at least one program executed by the processor 2411. The RF unit 2413 may be connected to the processor 2411 and may transmit or receive a radio signal. The processor 2411 may implement the functions, the processes, or the methods proposed by the exemplary embodiments of the present disclosure. Here, a wireless interface protocol layer in a wireless communication system according to an exemplary embodiment of the present disclosure may be implemented by the processor 2411. An operation of the base station 2410 according to an exemplary embodiment may be implemented by the processor 2411.

The terminal 2420 includes a processor 2421, a memory 2422, and a RF unit 2423. The memory 2422 may be connected to the processor 2421 and may store a variety of information for driving the processor 2421 or at least one program executed by the processor 2421. The RF unit 2423 may be connected to the processor 2421 and may transmit or receive a radio signal. The processor 2421 may implement the functions, the steps, or the methods proposed by the exemplary embodiments of the present disclosure. Here, a wireless interface protocol layer in a wireless communication system according to an exemplary embodiment of the present disclosure may be implemented by the processor 2421. An operation of the terminal 2420 according to an exemplary embodiment may be implemented by the processor 2421.

According to the exemplary embodiment of the present disclosure, the memory may be internal or external of the processor, and may be connected to the processor by various means which are already known. The memory is a volatile or non-volatile storing medium of various types. For example, the memory may include a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A terminal capable of measuring a channel in an unlicensed band of a wireless communication system, comprising:
    a processor, a memory, and a radio frequency unit, wherein the processor executes a program stored in the memory to perform steps of:
        receiving configuration information for a channel state information-reference signal (CSI-RS), wherein the configuration information configures CSI-RS subframes in which the CSI-RS is transmitted; and
        receiving the CSI-RS through the CSI-RS subframes based on the configuration information,
    wherein the CSI-RS is not transmitted in a subframe in which a synchronization signal overlaps with a symbol where the CSI-RS is configured even though the subframe belongs to the CSI-RS subframes.

2. The terminal of claim 1, wherein the processor executes the program to further performs a step of measuring a state of the channel based on the CSI-RS.

3. The terminal of claim 2, wherein the step of measuring includes measuring interference from another system when a resource for the CSI-RS is a zero-power (ZP) CSI-RS resource.

4. The terminal of claim 2, wherein a resource for the CSI-RS is a non zero-power (NZP) CSI-RS resource.

5. The terminal of claim 2, wherein the step of measuring includes measuring interference for the channel when a resource for the CSI-RS is a channel state information-interference measurement (CSI-IM) resource.

6. A method for transmitting a channel state information-reference signal (CSI-RS) to a terminal capable of measuring a channel in an unlicensed band of a wireless communication system, comprising:
    transmitting configuration information for the CSI-RS, wherein the configuration information configures CSI-RS subframes in which the CSI-RS is transmitted; and
    transmitting the CSI-RS through the CSI-RS subframes based on the configuration information,
    wherein the CSI-RS is not transmitted in a subframe hi which a synchronization signal overlaps with an orthogonal frequency division multiplexing (OFDM) symbol for the CSI-RS even though the subframe belongs to the CSI-RS subframes in a channel occupancy time (COT) for the unlicensed band.

* * * * *

UNITED STATES PATENT AND TRADEMARK OFFICE
CERTIFICATE OF CORRECTION

| | | |
|---|---|---|
| PATENT NO. | : 10,277,366 B2 | Page 1 of 1 |
| APPLICATION NO. | : 15/010855 | |
| DATED | : April 30, 2019 | |
| INVENTOR(S) | : Eunkyung Kim et al. | |

It is certified that error appears in the above-identified patent and that said Letters Patent is hereby corrected as shown below:

In the Claims

In Column 28, Line 31, Claim 6 reads:
"6. A method for transmitting a channel state information-reference signal (CSI-RS) to a terminal capable of measuring a channel in an unlicensed band of a wireless communication system, comprising:
transmitting configuration information for the CSI-RS, wherein the configuration information configures CSI-RS subframes in which the CSI-RS is transmitted; and
transmitting the CSI-RS through the CSI-RS subframes based on the configuration information, wherein the CSI-RS is not transmitted in a subframe hi which a synchronization signal overlaps with an orthogonal frequency division multiplexing (OFDM) symbol for the CSI-RS even though the subframe belongs to the CSI-RS subframes in a channel occupancy time (COT) for the unlicensed band."

Should read:
--6. A method for transmitting a channel state information-reference signal (CSI-RS) to a terminal capable of measuring a channel in an unlicensed band of a wireless communication system, comprising:
transmitting configuration information for the CSI-RS, wherein the configuration information configures CSI-RS subframes in which the CSI-RS is transmitted; and
transmitting the CSI-RS through the CSI-RS subframes based on the configuration information, wherein the CSI-RS is not transmitted in a subframe in which a synchronization signal overlaps with an orthogonal frequency division multiplexing (OFDM) symbol for the CSI-RS even though the subframe belongs to the CSI-RS subframes in a channel occupancy time (COT) for the unlicensed band.--

Signed and Sealed this
Eighteenth Day of July, 2023

Katherine Kelly Vidal
*Director of the United States Patent and Trademark Office*